United States Patent
Watanabe et al.

(10) Patent No.: US 10,900,536 B2
(45) Date of Patent: Jan. 26, 2021

(54) DAMPER

(71) Applicant: OILES CORPORATION, Tokyo (JP)

(72) Inventors: Hiroshi Watanabe, Fujisawa (JP);
Ryohei Kaneko, Fujisawa (JP)

(73) Assignee: OILES CORPORATION, Tokyo (JP)

( * ) Notice: Subject to any disclaimer, the term of this patent is extended or adjusted under 35 U.S.C. 154(b) by 51 days.

(21) Appl. No.: 16/309,579

(22) PCT Filed: Jun. 13, 2017

(86) PCT No.: PCT/JP2017/021875
§ 371 (c)(1),
(2) Date: Dec. 13, 2018

(87) PCT Pub. No.: WO2017/217432
PCT Pub. Date: Dec. 21, 2017

(65) Prior Publication Data
US 2019/0331190 A1 Oct. 31, 2019

(30) Foreign Application Priority Data

Jun. 15, 2016 (JP) .................. 2016-119417

(51) Int. Cl.
*F16F 9/14* (2006.01)
*F16J 15/16* (2006.01)
(Continued)

(52) U.S. Cl.
CPC .................. *F16F 9/14* (2013.01); *F16J 15/16* (2013.01); *B60G 2202/22* (2013.01); *F16F 9/12* (2013.01);
(Continued)

(58) Field of Classification Search
CPC .... F16J 15/08; F16J 15/16; F16J 15/32; F16F 9/14; F16F 9/44; F16F 9/145; A47K 13/12; B60N 2/20; B60N 2/22; B60N 2/90
(Continued)

(56) References Cited

U.S. PATENT DOCUMENTS 2,420,039 A * 5/1947 Frisby ...................... F16J 15/38
277/500
3,180,650 A * 4/1965 Liebig .................. F16J 15/3272
277/572
(Continued)

FOREIGN PATENT DOCUMENTS

CN 1176354 3/1998
CN 1456826 11/2003
(Continued)

OTHER PUBLICATIONS

International Search Report for PCT/JP2017/021875, dated Sep. 19, 2017, 4 pages.
(Continued)

*Primary Examiner* — Christopher P Schwartz
(74) *Attorney, Agent, or Firm* — Nixon & Vanderhye P.C.

(57) ABSTRACT

Provided is a damper wherein viscous fluid which fills a circular cylinder chamber is more reliably prevented from leaking.
A rotary damper (1) includes: a first seal ring (8*a*) of an elastic body, arranged between a through-hole (23) of a circular cylinder chamber (21) in a case (2) and a lower end of a rotor body of a rotor (3); and a second seal ring (8*b*) of an elastic body, arranged between a through-hole (60) in a lid (6) and an upper end of the rotor body. The first seal ring (8*a*) has: an outer peripheral surface with a width in a direction of a center axis of the circular cylinder chamber (21), which is pressed against an inner peripheral surface of
(Continued)

(A)

(B)

the through-hole (23); and an inner peripheral surface with a width in the direction of the center axis of the circular cylinder chamber (21), which is pressed against an outer peripheral surface of the lower end of the rotor body, and also a second seal ring (8*b*) has: an outer peripheral surface with a width in the direction of the center axis of the circular cylinder chamber (21), which is pressed against an inner peripheral surface of the through-hole (60); and an inner peripheral surface with a width in the direction of the center axis of the circular cylinder chamber (21), which pressed against an outer peripheral surface of the upper end of the rotor body.

19 Claims, 12 Drawing Sheets

(51) Int. Cl.
*B60N 2/20* (2006.01)
*F16F 9/12* (2006.01)
*F16F 9/32* (2006.01)

(52) U.S. Cl.
CPC ..... *F16F 9/3242* (2013.01); *F16F 2230/0047* (2013.01)

(58) Field of Classification Search
USPC .................. 188/290, 293, 296; 464/24, 180; 277/402, 500–504
See application file for complete search history.

(56) References Cited

U.S. PATENT DOCUMENTS

| | | | | |
|---|---|---|---|---|
| 4,541,638 A | * | 9/1985 | Ogawa | F16J 15/008 277/402 |
| 5,152,189 A | * | 10/1992 | Miura | F16F 9/145 464/180 |
| 6,095,922 A | | 8/2000 | Friedrichsen et al. | |
| 6,662,683 B1 | * | 12/2003 | Takahashi | B60N 3/023 188/290 |
| 7,111,712 B2 | * | 9/2006 | Orita | F16F 9/145 188/290 |
| 2002/0007993 A1 | * | 1/2002 | Kobori | F16F 9/145 188/290 |
| 2003/0234145 A1 | | 12/2003 | Iwashita | |
| 2014/0190779 A1 | * | 7/2014 | Horita | B62D 33/027 188/282.1 |
| 2017/0321780 A1 | * | 11/2017 | Horita | F16F 9/125 |

FOREIGN PATENT DOCUMENTS

| | | |
|---|---|---|
| CN | 103403388 | 11/2013 |
| DE | 25 15 985 | 10/1976 |
| GB | 2 131 896 | 6/1984 |
| JP | 47-029195 | 9/1972 |
| JP | 62-049056 | 3/1987 |
| JP | 62-274126 | 11/1987 |
| JP | 3-114602 | 11/1991 |
| JP | 2003-506256 | 2/2003 |
| JP | 2005-30537 | 2/2005 |
| JP | 2006-153034 | 6/2006 |
| JP | 2008-039084 | 2/2008 |
| JP | 2013-203280 | 10/2013 |
| JP | 2014-005883 | 1/2014 |

OTHER PUBLICATIONS

Search Report issued in CN Appln. No. 201780036686.1 dated Apr. 23, 2020 (w/ translation).

Search Report issued in EP Appln. No. 17813327.8 dated Jan. 24, 2020.

\* cited by examiner

Fig. 7
(A) 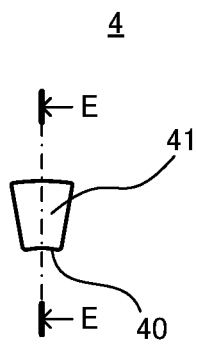
(B) 
(C) 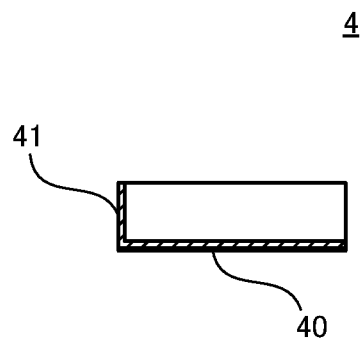

Fig. 12
(A)
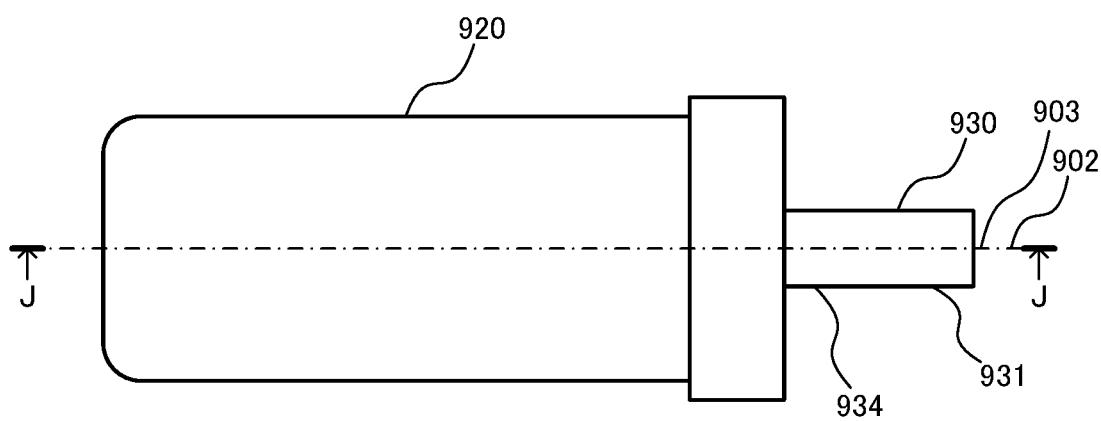
(B)
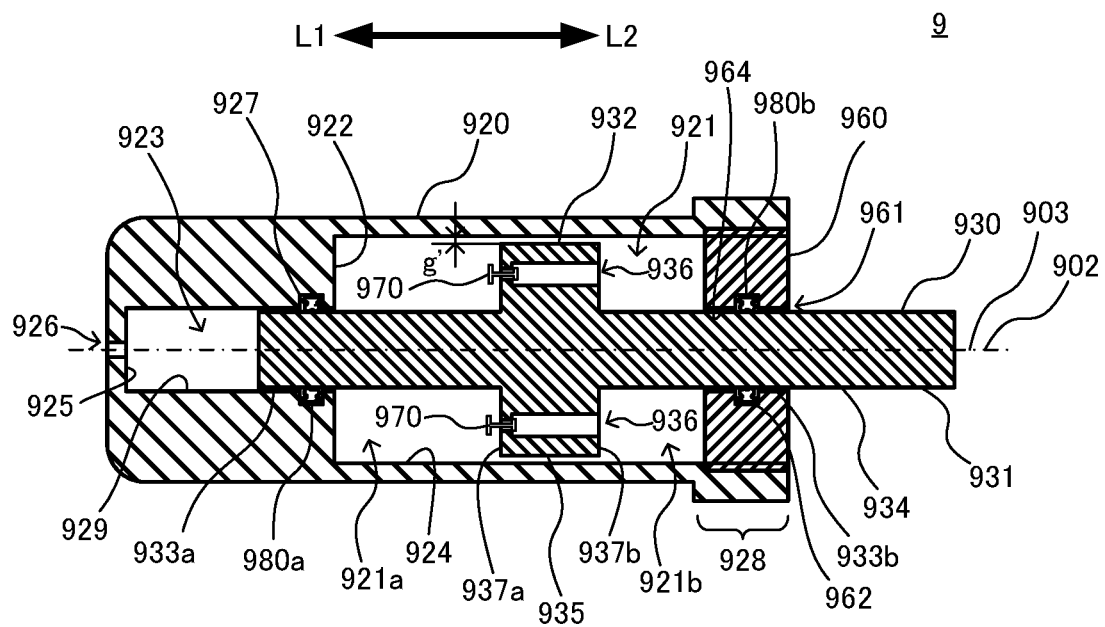

DAMPER

This application is the U.S. national phase of International Application No. PCT/JP2017/021875 filed 13 Jun. 2017, which designated the U.S. and claims priority to JP Patent Application No. 2016-119417 filed 15 Jun. 2016, the entire contents of each of which are hereby incorporated by reference.

The present invention relates to a damper that limits the movement of viscous fluid to apply a damping force in reaction to an external force.

BACKGROUND ART

A known damper gives a damping force in reaction to an external force by limiting a movement of a viscous fluid. This type of damper includes: a fluid holding chamber with an opening, which holds the viscous fluid; a resistance generating member which partitions an inside of the fluid holding chamber and is inserted in the opening of the fluid holding chamber to move or rotate relative to the fluid holding chamber receiving by the external force; volume changing means which partitions the inside of the fluid holding chamber, and compresses one area and expands another area within the partitioned fluid holding chamber according to rotating motion of the resistance generating member relative to the fluid holding chamber; and a flow path which connects between the areas in the fluid holding chamber partitioned by the volume changing means.

For example, the Patent Literature 1 discloses a rotary damper for generating a damping torque in reaction to an applied rotating force by limiting the movement of a viscous fluid. This rotary damper includes: a housing having an inner chamber with one end portion opened; a rotor housed in the inner chamber of the housing; the viscous fluid (viscous materials) filled in the inner chamber of the housing; a plug attached to an opening side end portion of the housing to seal the viscous fluid filled in the inner chamber of the housing thereinto. The housing and the plug forms the fluid holding chamber together.

The rotor includes a rotor body of a circular cylinder shape and movable vanes projecting radially outward from an outer peripheral surface of the rotor body toward an inner peripheral surface of the inner chamber of the housing. The rotor body corresponds to the resistance generating member.

Fixed vanes are formed on the inner peripheral surface of the inner chamber of the housing so as to project radially inward toward the outer peripheral surface of the rotor body and to partition an inside of the inner chamber of the housing. The fixed vanes form the volume changing means together with the movable vanes of the rotor.

In each fixed vane of the housing, is formed a flow path (i.e. orifice) connecting between areas in the inner chamber of the housing partitioned by the fixed vanes.

In each of a bottom surface of the inner chamber of the housing and the plug, is formed a through-hole for inserting a corresponding end portion of the rotor body rotatably. These through-holes correspond to the opening of the fluid holding chamber. One end portion of the rotor body is inserted into the through-hole formed in the bottom surface of the inner chamber of the housing, another end portion of the rotor body is inserted into the through-hole formed in the plug, and thereby the rotor is housed in the inner chamber of the housing so as to be rotatable relative to the inner chamber.

In the structure as described above, as for the rotary damper, when the rotating force is applied to the rotor to rotate the rotor relative to the inner chamber of the housing, the area located upstream in a rotor rotation direction from each fixed vane of the inner chamber is compressed by the movable vane and a pressure on the viscous fluid in this area is increased. Therefore, the viscous fluid in this area passes through the flow path formed on the fixed vane and moves to the area located downstream in the rotor rotation direction from the fixed vane of the inner chamber. At this time, the damping torque generates depending on a resistance by the motion of the viscous fluid (the hardness of the motion of the viscous fluid through the flow path).

CITATION LIST

Patent Literature

Patent Literature 1: Japanese Unexamined Patent Application Laid-Open No. 2014-005883

SUMMARY OF INVENTION

Technical Problem

Generally, in a damper for applying a damping force in reaction to an external force by limiting a movement of a viscous fluid, an O-ring made of an elastic body such as rubber is arranged between an opening of a fluid holding chamber and a resistance generating member inserted in the opening so as to prevent leakage of the viscous fluid held in the fluid holding chamber through a gap therebetween. Therefore, the following may occurs.

Specifically, it may occur that the external force applied to the resistance generating member deforms the O-ring elastically to deviate a center axis of the resistance generating member from a center axis of the fluid holding chamber, thus causing a shaft misalignment. Here, the O-ring is of a circular cross-section, so the elastic deformation of the O-ring in a radial direction changes a contact area between the O-ring and each of the resistance generating member and the opening of the fluid holding chamber. If this causes seal tightness between the opening of the fluid holding chamber and the resistance generating member inserted into the opening to become unstable, the viscous fluid held by the fluid holding chamber may leak from the gap therebetween.

The present invention has been made in view of the above situation, and an object of the present invention is to provide a damper that can more surely prevent a leakage of a viscous fluid held within a fluid holding chamber.

Solution to Problem

In response to the above issue, in a damper according to the present invention, an elastic member of annular shape is arranged between a fluid holding chamber and a resistance generating member inserted into the fluid holding chamber. The elastic member includes an outer peripheral surface having a width in a direction of a center axis of the fluid holding chamber and being pressed against the fluid holding chamber; and an inner peripheral surface having a width in the direction of the center axis of the fluid holding chamber and being pressed against the resistance generating member.

For example, the present invention provides
a damper generating a damping force in reaction to an external force by limiting a movement of a viscous fluid, the damper comprising:

a fluid holding chamber having an opening portion and holding the viscous fluid;

a resistance generating member inserted into the fluid holding chamber, the resistance generating member being movable relative to the fluid holding chamber by the external force;

a volume changing means partitioning an inside of the fluid holding chamber, and the volume changing means compressing one of areas and expanding another of the area in the partitioned fluid holding chamber with a movement of the resistance generating member relative to the fluid holding chamber;

a flow path connecting between the areas in the fluid holding chamber partitioned by the volume changing means; and an elastic member of annular shape, arranged between the resistance generating member and the fluid holding chamber;

the elastic member comprising:

an inner peripheral surface having a width in a direction of a center axis of the fluid holding chamber and being pressed against the resistance generating member; and an outer peripheral surface having a width in the direction of the center axis of the fluid holding chamber and being pressed against the fluid holding chamber.

Advantageous Effects of Invention

According to the present invention, between the fluid holding chamber and the resistance generating member inserted into the fluid holding chamber is arranged the annular elastic member which includes the inner and outer peripheral surfaces each having a width in the direction of the center axis of the fluid holding chamber. Therefore, even if misalignment of the resistance generating member happens to deform the elastic member elastically in a radial direction, it is possible to reduce any changes in a contact area between the elastic member and each of the fluid holding chamber and the resistance generating member. This causes a seal tightness between the fluid holding chamber and the resistance generating member to become stable in property, thus reducing the possibility of leakage of the viscous fluid held in the fluid holding chamber from a gap between the fluid holding chamber and the resistance generating member.

BRIEF DESCRIPTION OF DRAWINGS

FIGS. 7(A) and 7(B) are respectively a front view and a back view of a first seal member 4, and FIG. 7(C) is an E-E cross-section view of the first seal member 4 illustrated in FIG. 7(A);

FIG. 12(A) is a side view of a linear type damper 9 according to another embodiment of the present invention, and FIG. 12(B) is a J-J cross-section view of the linear type damper illustrated in FIG. 12(A).

DESCRIPTION OF EMBODIMENTS

Figure 1:
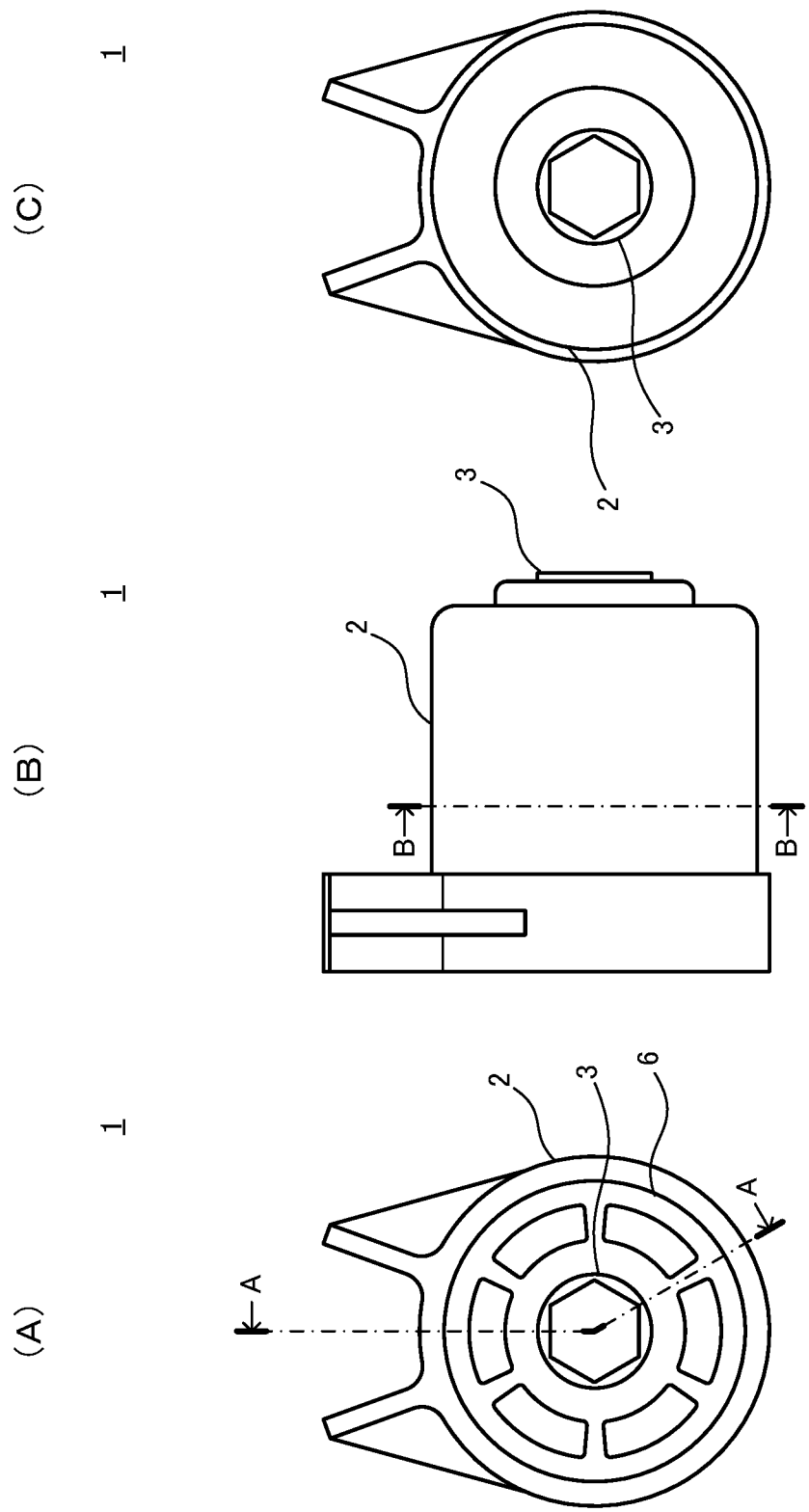
FIGS. 1(A)-1(C) are respectively a front view, a side view, and a back view of a rotary damper 1 according to one embodiment of the present invention.

In the following, one embodiment of the present invention will be described referring to the drawings.

Figure 2:
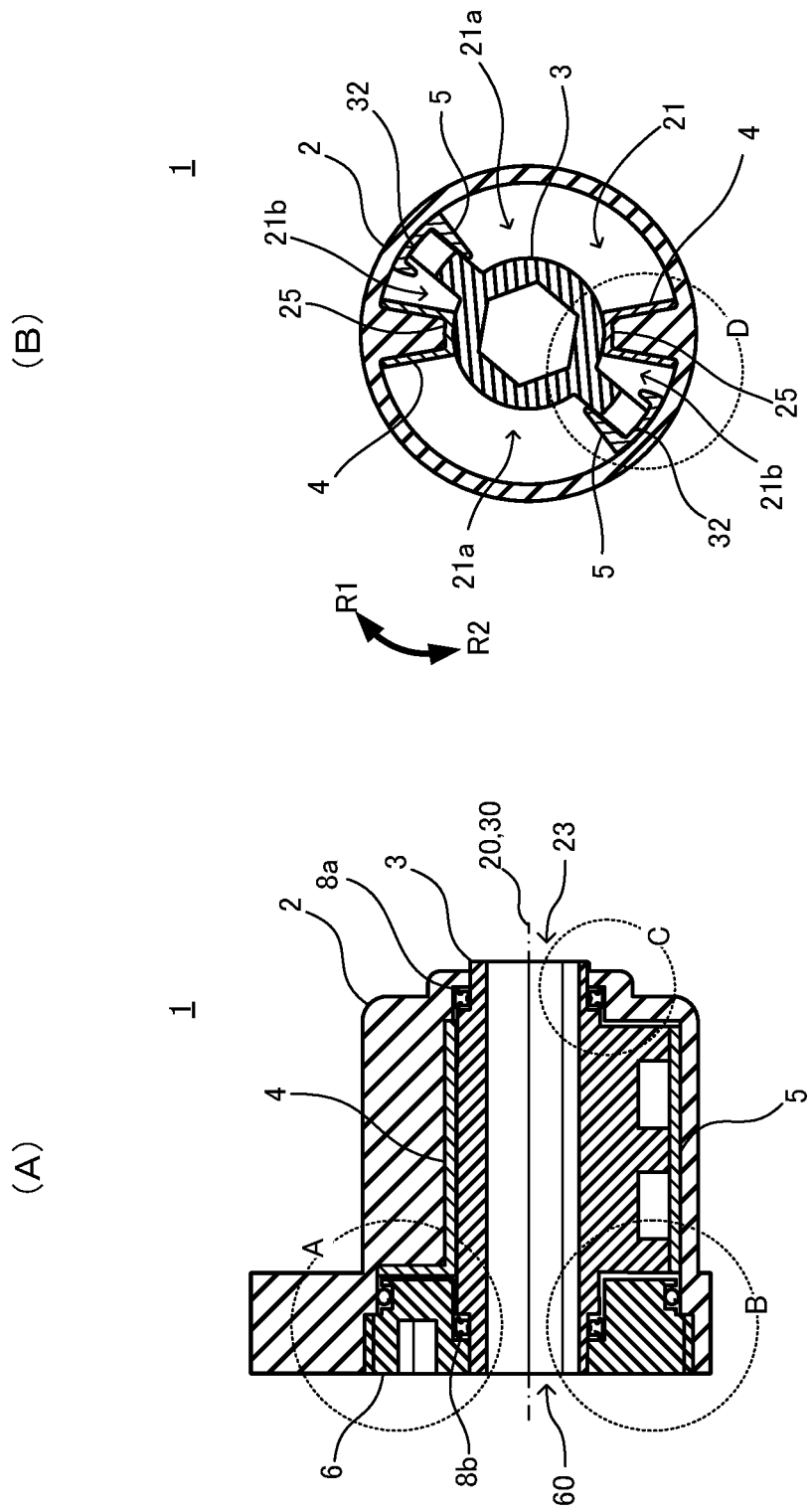
FIG. 2(A) is an A-A cross-section view of the rotary damper 1 illustrated in FIG. 1(A)
FIG. 2(B) is a B-B cross-section view of the rotary damper 1 illustrated in FIG. 1(B)
Figure 3:
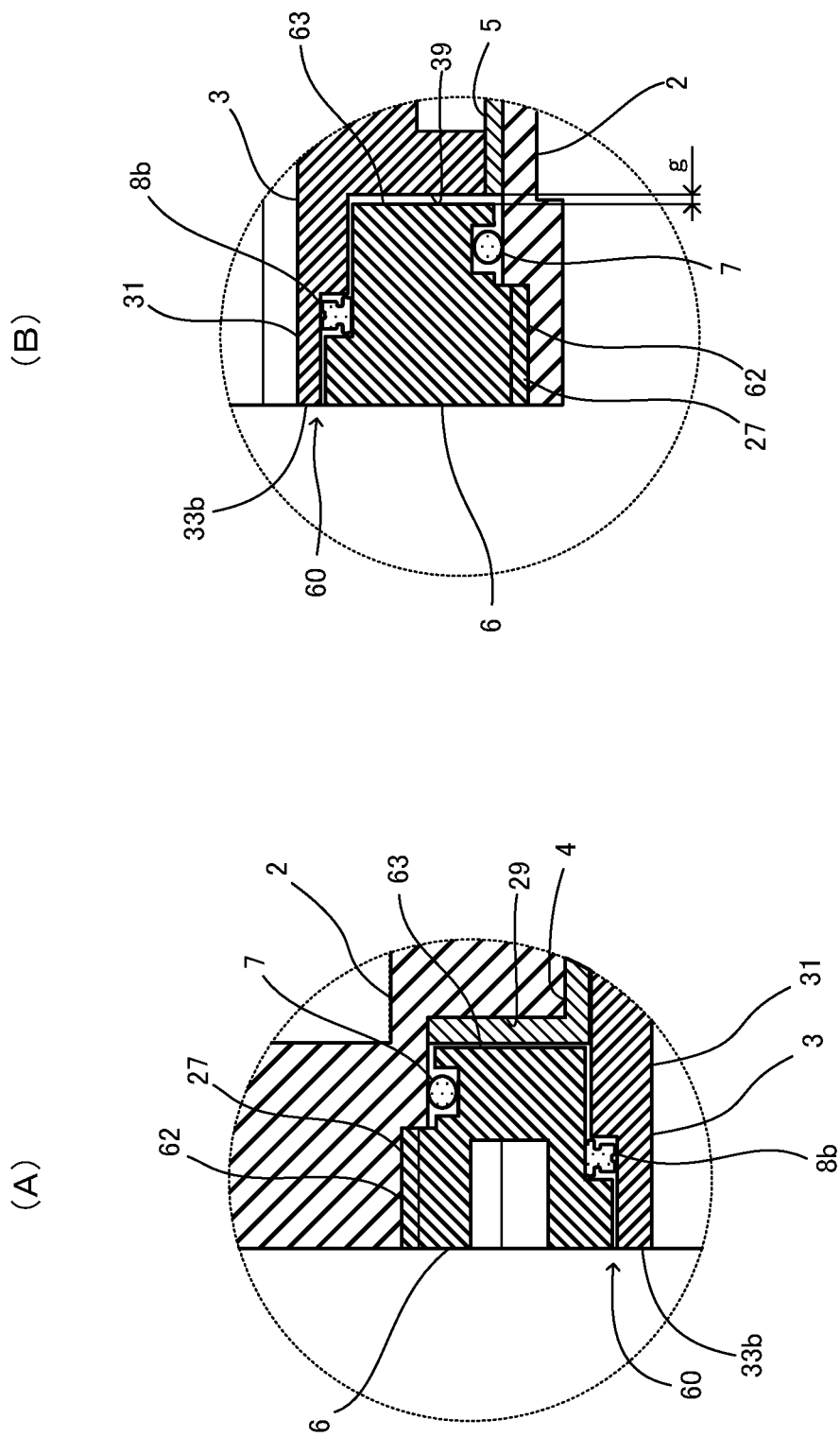
FIGS. 3(A) and 3(B) are respectively an enlarged view of the part A and an enlarged view of the part B of the rotary damper 1 illustrated FIG. 2(A)
Figure 4:
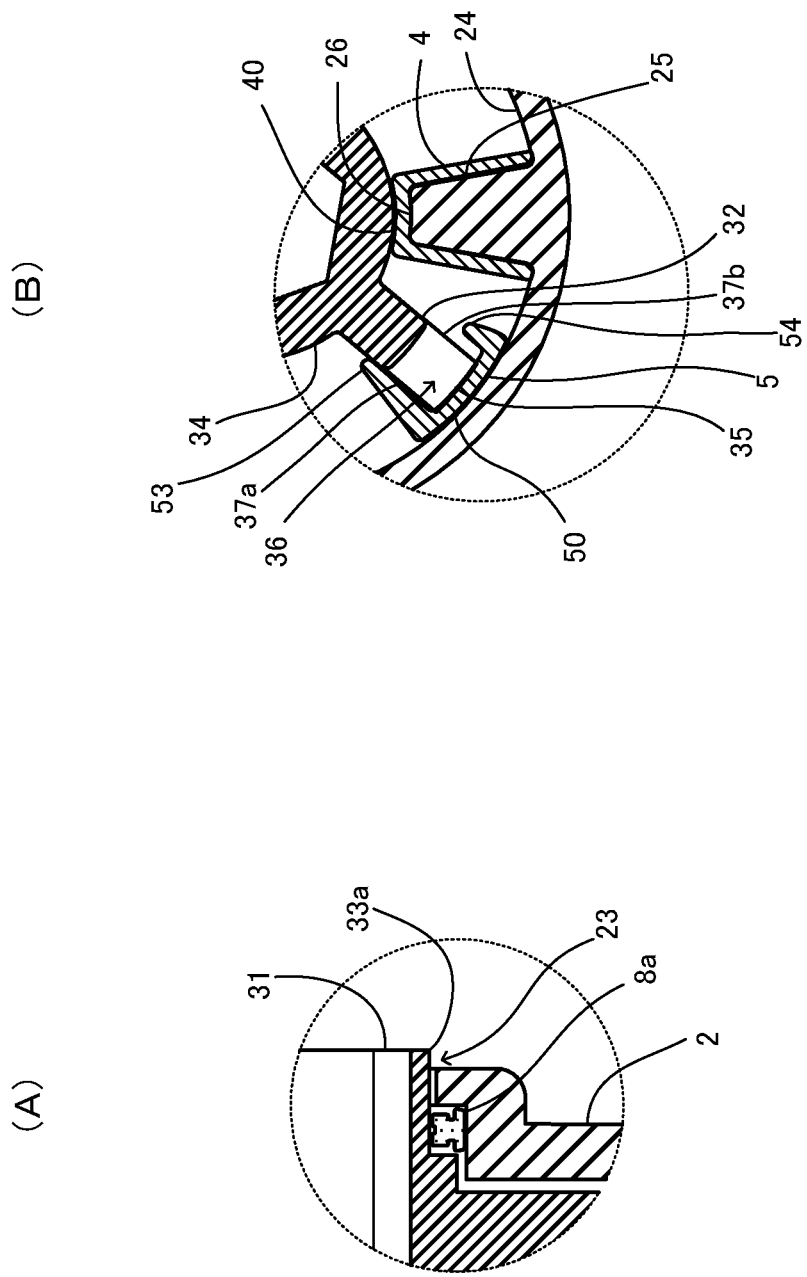
FIG. 4(A) is an enlarged view of the part C of the rotary damper 1 illustrated FIG. 2(A)
FIG. 4(B) is an enlarged view of the part D of the rotary damper 1 illustrated in FIG. 2(B)

FIGS. 1(A)-1(C) are respectively a front view, a side view, and a back view of a rotary damper 1 according to one embodiment of the present invention. FIG. 2(A) is an A-A cross-section view of the rotary damper 1 illustrated in FIG. 1(A), and FIG. 2(B) is a B-B cross-section view of the rotary damper 1 illustrated in FIG. 1(B). FIGS. 3(A) and 3(B) are respectively an enlarged view of the part A and an enlarged view of the part B of the rotary damper 1 illustrated FIG. 2(A). FIG. 4(A) is an enlarged view of the part C of the rotary damper 1 illustrated FIG. 2(A), and FIG. 4(B) is an enlarged view of the part D of the rotary damper 1 illustrated in FIG. 2(B).

A rotary damper 1 according the embodiment can be used for a device in which a rotational motion of a bi-directionally rotatable rotator is to be damped, such as seats with reclining function used in apparatuses, for example, automobiles, railroad vehicles, aircrafts, and vessels. As illustrated in the figures, the rotary damper 1 according the embodiment includes: a case 2 and a lid 6 which form a fluid holding chamber holding a viscous fluid (not shown), such as oil and silicone; and a rotor 3 housed in the fluid holding chamber so as to be rotatable relative to the fluid holding chamber.

Figure 5:
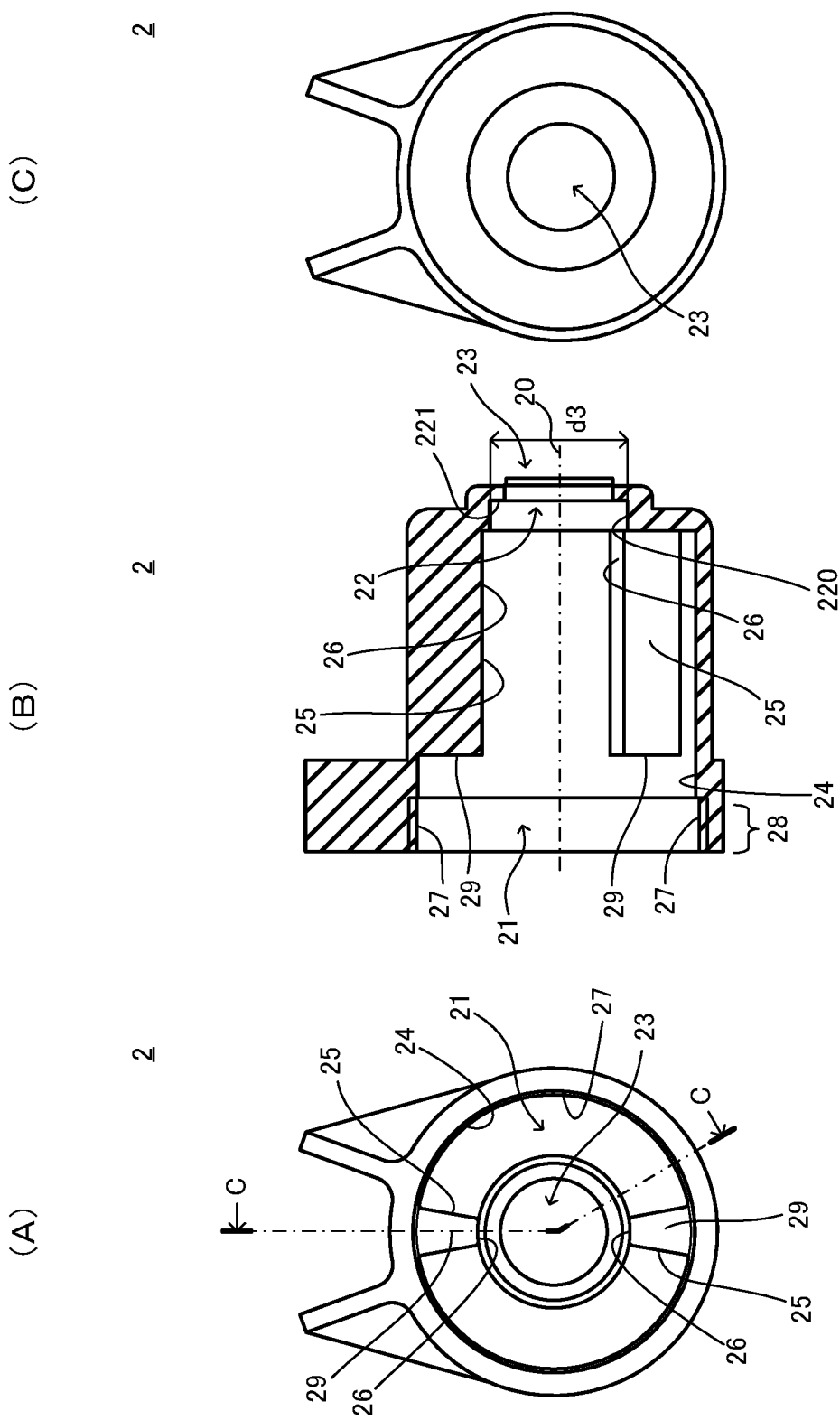
FIG. 5(A) is a front view of a case 2.
FIG. 5(B) is a C-C cross-section view of the case 2 illustrated in FIG. 5(A)
FIG. 5(C) is a back view of the case 2.

FIG. 5(A) is a front view of the case 2, FIG. 5(B) is a C-C cross-section view of the case 2 illustrated in FIG. 5(A), and FIG. 5(C) is a back view of the case 2.

Figure 6:
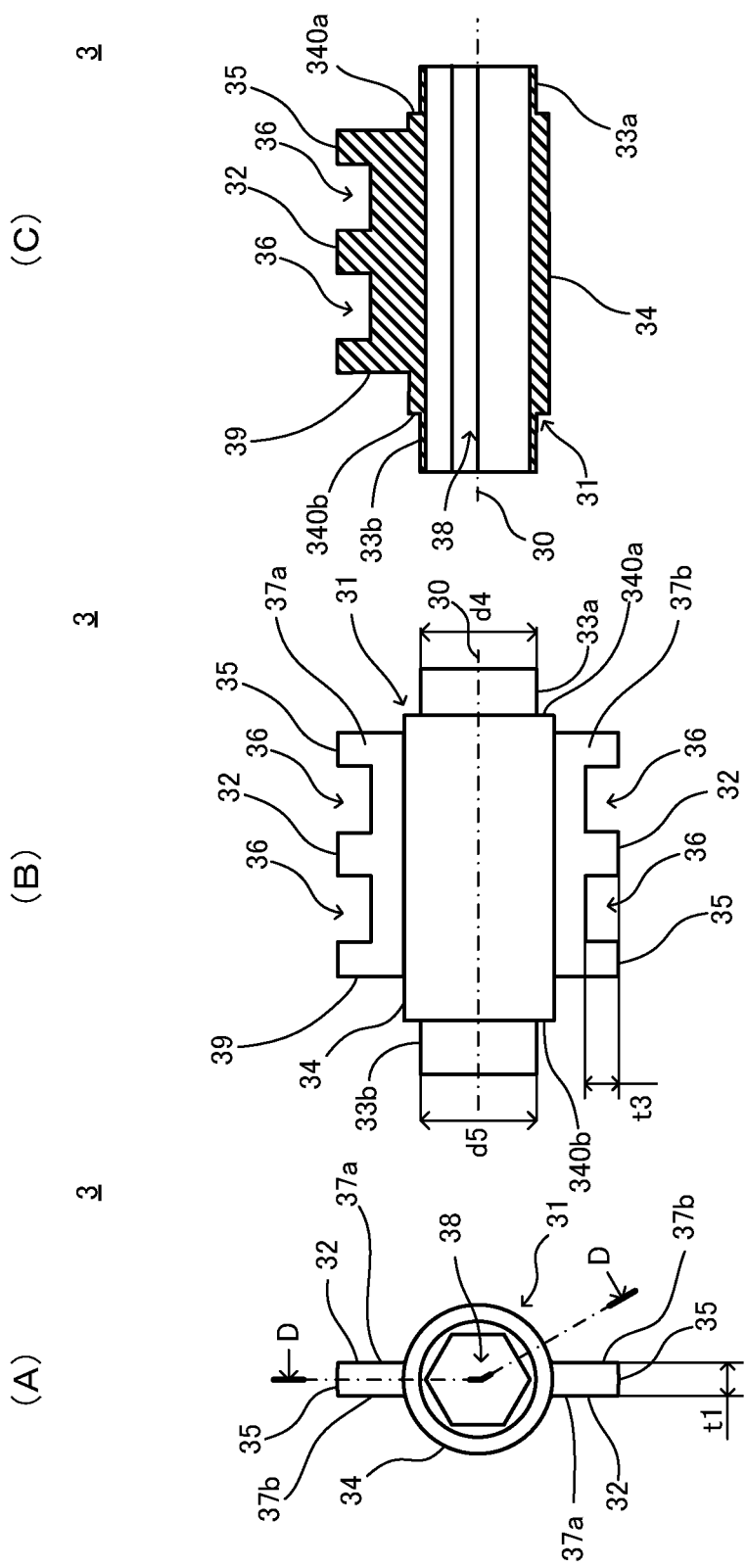
FIGS. 6(A) and 6(B) are respectively a front view and a side view of a rotor 3.
FIG. 6(C) is a D-D cross-section view of the rotor 3 illustrated in FIG. 6(A)

As illustrated in the figures, a circular cylinder chamber 21 with one end portion opened, i.e. a space having a circular cylinder shape with a bottom, is formed inside of the case 2. A through-hole 23 for insertion of the rotor 3 serving as an opening of a fluid holding chamber, is formed in a bottom 22 of a circular cylinder chamber 21. The rotor 3, when a insertion of a lower end portion 33$a$ of a rotor body 31 as described below (See FIG. 6) into this through-hole 23, is housed in the circular cylinder chamber 21 so as to align a rotation axis 30 of the rotor 3 with a center axis 20 of the circular cylinder chamber 21 (See FIG. 2(A) and FIG. 4(A)). Moreover, a inner peripheral surface 220 of the through-hole 23 of the circular cylinder chamber 21 is provided with a step 221 formed thereon, and the step 221 prevents a first seal ring 8a described below (See FIG. 4(A)), attached to the lower end portion 33a of the rotor body 31, from moving outward in an axial direction.

Figure 9:
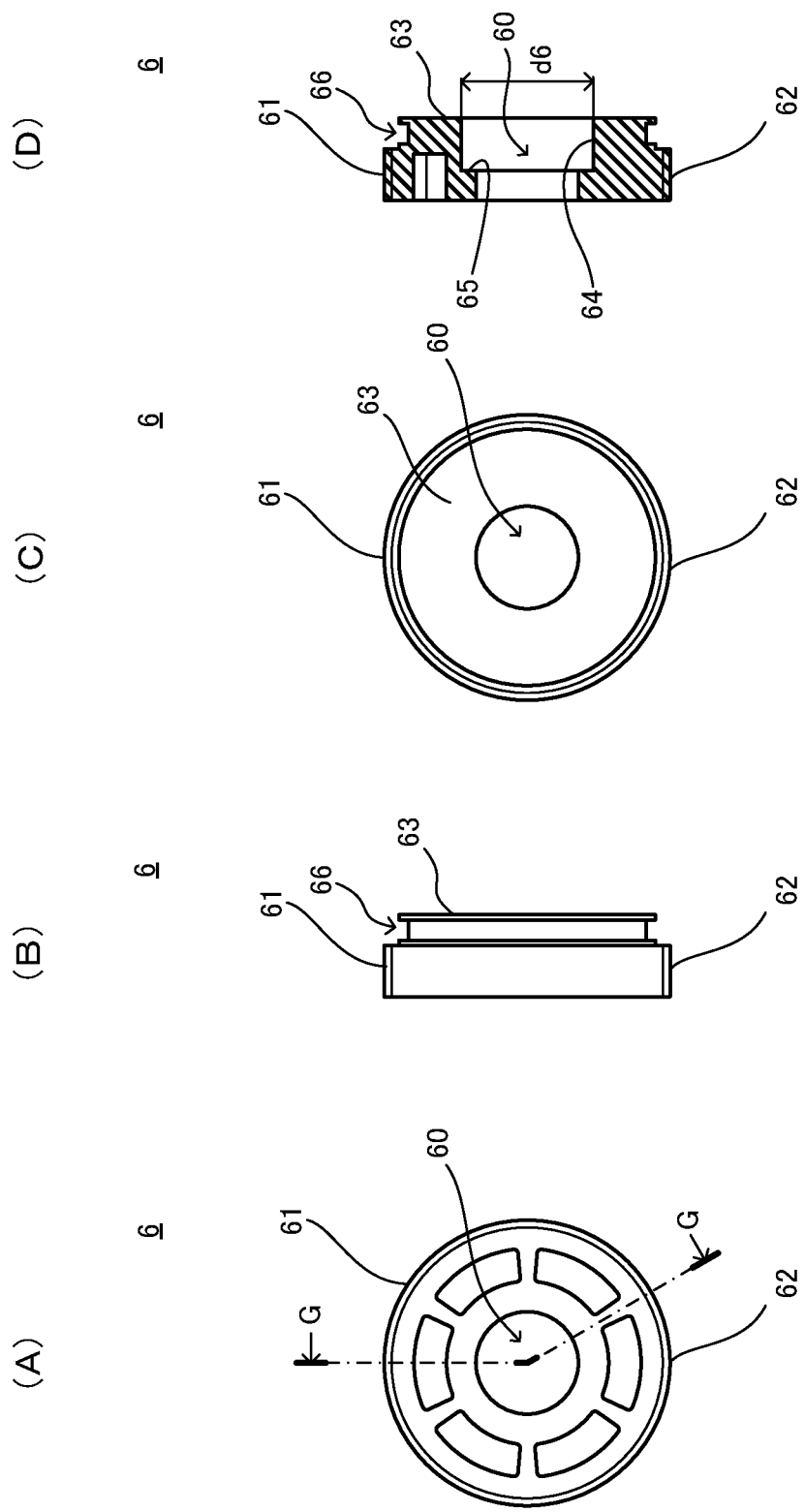
FIGS. 9(A)-9(C) are a front view, a side view, and a back view of a lid 6.
FIG. 9(D) is a G-G cross-section view of the lid 6 illustrated in FIG. 9(A)

Furthermore, on an inner peripheral surface 24 of the circular cylinder chamber 21, a pair of partitioning portions 25 is formed along the center axis 20 of the circular cylinder chamber 21 and axisymmetrically with respect to this center axis 20; each partitioning portion 25 projects radially inward from the inner peripheral surface 24 so as to place an end surface 26 of the partitioning portion 25 close to an outer peripheral surface 34 (See FIG. 6) of the rotor body 31 of the rotor 3 described below, thus partitioning an inside of the circular cylinder chamber 21. A first seal member 4 described below is attached to each partitioning portion 25 in the pair of partitioning portions 25 (See FIG. 2(B) and FIG. 4(B)). Moreover, the circular cylinder chamber 21 is provided with an internal threaded portion 27 formed on an opening side 28 of the inner peripheral surface 24 of the circular cylinder chamber 21, and the internal threaded portion 27 is to be screwed onto an external threaded portion 62, described below, of the lid 6 (See FIG. 9).

FIGS. 6(A) and 6(B) are respectively a front view and a side view of the rotor 3, and FIG. 6(C) is a D-D cross-section view of the rotor 3 illustrated in FIG. 6(A)

As illustrated in the figures, the rotor 3 includes the rotor body 31 of a circular cylinder shape and a pair of vanes (rotor blades) 32 formed axisymmetrically with respect to the rotation axis 30 of the rotor body 31.

Each of the vanes 32 is formed along with the rotation axis 30 of the rotor 3 and projects radially outward from the outer peripheral surface 34 of the rotor body 31 so as to place an end surface 35 of the vane 32 close to the inner peripheral surface 24 of the circular cylinder chamber 21 in the case 2, thereby partitioning the inside of the circular cylinder chamber 21. Each vane 32 forms volume changing system together with the partitioning portions 25 of the circular cylinder chamber 21 in the case 2, to compress corresponding one area and to expand corresponding another area within the fluid holding chamber partitioned by the vanes 32.

A flow path 36 is formed on each of the vanes 32 along the rotating direction of the rotor 3 so as to pass through both side surfaces 37a, 37b on the corresponding vane 32. Moreover, second seal members 5 described below are attached to the vanes 32 (See FIG. 2(B) and FIG. 4(B)).

The rotor body 31 works as a resistance generating member that is rotatable relative to the fluid holding chamber with an external rotational force. The lower end portion 33a of the rotor body 31 is to be rotatably inserted into the through-hole 23 formed in the bottom 22 of the circular cylinder chamber 21 in the case 2 (See FIG. 2(A) and FIG. 4(A)), and an upper end portion 33b of the rotor body 31 is to be rotatably inserted into a through-hole 60 (See FIG. 9), described below, of the lid 6 (See FIG. 2(A), FIG. 3(A) and FIG. 3(B)).

An insertion hole 38 centered at the rotation axis 30 is formed on the rotor body 31, to use for insertion of a hexagon shaft (not shown) to transmit the external rotational force to the rotor 3. The first seal ring 8a described below is attached to the lower end portion 33a of the rotor body 31 (See FIG. 4(A)). Moreover, the outer peripheral surface 34 of the lower end portion 33a of the rotor body 31 is provided with a step 340a formed thereon, and the step 340a prevents the first seal ring 8a attached around the lower end portion 33a from moving inward in the axial direction. Meanwhile, a second seal ring 8b described below is rotatably attached to the upper end portion 33b of the rotor body 31 (See FIG. 3(A) and FIG. 3(B)). The outer peripheral surface 34 of the upper end portion 33b of the rotor body 31 is provided with a step 340b formed thereon, and the step 340b prevents the second seal ring 8b attached around the upper end portion 33b from moving inward in the axial direction.

FIGS. 7(A) and 7(B) are respectively a front view and a back view of the first seal member 4, and FIG. 7(C) is an E-E cross-section view of the first seal member 4 illustrated in FIG. 7(A).

As illustrated in the figures, each first seal member 4 is of U-shape attachable to the corresponding partitioning portion 25 of the circular cylinder chamber 21 in the case 2 and has a sidewall portion 41 at one end. The first seal member 4 fills a gap between the partitioning portion 25 and the rotor body 31, due of the interposition of a bottom 40 between the end surface 26 of the partitioning portion 25 and the outer peripheral surface 34 of the rotor body 31 of the rotor 3(See FIG. 4(B)), and moreover fills a gap between the partitioning portion 25 and the lid 6, due of the interposition of the sidewall portion 41 between an upper surface 29 of the partitioning portion 25 and a lower surface 63 of the lid 6 described below (See FIG. 3(A)).

Since the first seal member 4 is arranged between the case 2 and the rotor 3 that move relative to each, resin excellent in sliding properties, such as polyamide, is preferably used as the material for the first seal member 4.

Figure 8:
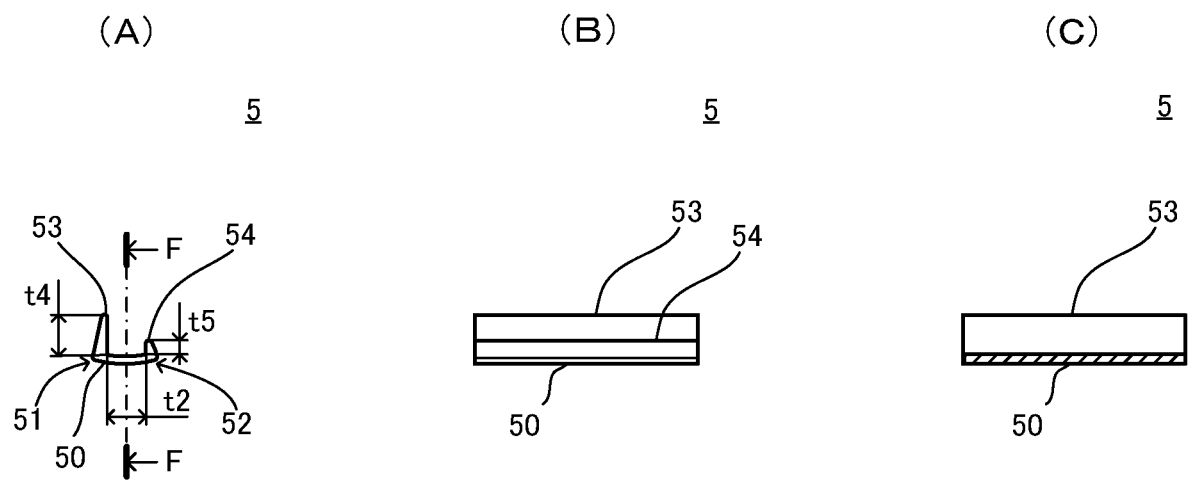
FIGS. 8(A) and 8(B) are respectively a front view and a side view of a second seal member 5.
FIG. 8(C) is an F-F cross-section view of the second seal member 5 illustrated in FIG. 8(A)

FIGS. 8(A) and 8(B) are respectively a front view and a side view of the second seal member 5, and FIG. 8(C) is an F-F cross-section view of the second seal member 5 illustrated in FIG. 8(A).

As illustrated in the figures, each second seal member 5 is of U-shape attachable to the corresponding vane 32 of the rotor 3 and is provided with a bottom 50 of a width t2 longer than a width t1 (See FIG. 6(A)) of vane 32 in the rotating direction; a first leg portion 53 integrally formed on one end portion 51 of the bottom 50, having a width t4 longer than a radial width t3 (See FIG. 6(B)) of the flow path 36 formed in the vane 32; and a second leg portion 54 integrally formed on the other end portion 52 of the bottom 50, having a width t5 shorter than the radial width t3 (See FIG. 6(B)) of the flow path 36 formed in the vane 32.

The second seal member 5 attached to the vane fills a gap between the vane 32 and the case 2 (See FIG. 4(B)), due of the interposition of the bottom 50 between the end surface 35 of the vane 32 and the inner peripheral surface 24 of the circular cylinder chamber 21 in the case 2. As illustrated in FIG. 2(B), in case of rotating the rotor 3 relative to the circular cylinder chamber 21 of the case 2 in a first rotating direction R1, the first leg portion 53 of the second seal member 5 is brought into contact with one side surface 37a of the vane 32, thereby closing the flow path 36 formed on the vane 32. In the other case of rotating the rotor 3 relative to the circular cylinder chamber 21 in the case 2 in a second rotating direction R2, namely in the direction opposite to the first rotating direction R1, the first leg portion 53 of the second seal member 5 moves away from one side surface 37a of the vane 32 and the second leg portion 54 is brought into contact with the other side surface 37b of the vane 32, thus opening the flow path 36 formed on the vane 32 (See FIG. 4(B)).

Since the second seal member 5 is arranged between the case 2 and the rotor 3 that move relative to each, resin excellent in sliding properties, such as polyamide, is preferably used as the material for the second seal member 5.

FIGS. 9(A)-9(C) are a front view, a side view, and a back view of the lid 6, and FIG. 9(D) is a G-G cross-section view of the lid 6 illustrated in FIG. 9(A).

As illustrated in the figures, on the lid 6, the through-hole 60 for insertion of the rotor 3 serving as the opening of the fluid holding chamber, is formed at a position opposite to the through-hole 23 formed in the bottom 22 of the circular cylinder chamber 21 in the case 2. The upper end portion 33b of the rotor body 31 of the rotor 3 is inserted into this through-hole 60. Moreover, an inner peripheral surface of the through-hole 60 is provided with a step 65 formed thereon, and the step 65 prevents the second seal ring 8b (See FIG. 3(A)), described below, attached to the upper end portion 33b of the rotor body 31 from moving outward in the axial direction. A gap is formed between the lower surface 63 of the lid 6 and an upper surface 39 of the vane 32 of the rotor 3, serving a flow path for the viscous fluid filled in the circular cylinder chamber 21 (See FIG. 3(B)).

In an outer peripheral surface 61 of lid 6, is formed the external threaded portion 62 to be screwed into the internal threaded portion 27 formed on the opening side 28 of the inner peripheral surface 24 of the circular cylinder chamber 21 and also is formed a circumferential groove 66 for installation of an O-ring on the lower surface 63 side in relation to the external threaded portion 62. The O-ring 7 is installed in the groove 66 and is interposed between the outer peripheral surface 61 of the lid 6 and the inner peripheral surface 24 of the circular cylinder chamber 21, thereby preventing the viscous fluid from leaking outside through a threaded engagement section between the external threaded portion 62 of the lid 6 and the internal threaded portion 27 of the circular cylinder chamber 21 (See FIG. 3(A) and FIG. 3(B)).

FIG. 10(A) is a front view of first and second seal rings 8a, 8b, FIG. 10(B) is an H-H cross-section view of the first and second seal rings 8a, 8b illustrated in FIG. 10(A), and FIG. 10(C) is an enlarged view of the part E of the first and second seal rings 8a, 8b illustrated in FIG. 10(A), and FIG. 10(D) is an enlarged view of the part F the first and second seal rings 8a, 8b illustrated in FIG. 10(B).

As illustrated in the figures, the first seal ring 8a and the second seal ring 8b are annular members made of elastic material, such as nitrile butadiene rubber (NBR). The first seal ring 8a has an inner diameter d1 smaller than an outer diameter d4 of the lower end portion 33a of the rotor body 31 of the rotor and an outer diameter d2 larger than an inner diameter (an outer diameter of the step 221) d3 of the through-hole 23 of the circular cylinder chamber 21 in the case 2, and the second seal ring 8b has an inner diameter d1 smaller than an outer diameter d5 of the upper end portion 33b of the rotor body 31 of the rotor and an outer diameter d2 larger than an inner diameter (outer diameter of the step 65) d6 of the through-hole 60 of the lid 6. Moreover, each of the first seal ring 8a and the second seal ring 8b includes an inner periphery side annular portion 81 rectangular in cross-section, an outer periphery side annular portion 82 rectangular in cross-section, and a coupling portion 83.

The inner periphery side annular portion 81 of each ring 8a, 8b has an inner peripheral surface 84 of a width t6 that is a flat surface in a direction of a center axis 80 coincident with the center axis 20 of the circular cylinder chamber 21 in the case 2. As an inner peripheral surfaces 84 of both rings 8a, 8b have the respective widths t6 flatly in the direction of the center axis 80, it is possible to reduce any changes in contact areas between the inner peripheral surfaces 84 and respective counterpart surfaces in case where the first seal ring 8a and the second seal ring 8b are elastically deformed in a radial direction. The inner peripheral surface 84 of the first seal ring 8a is pressed against the outer peripheral surface 34 of the lower end portion 33a of the rotor body 31 of the rotor 3, and that of the second seal ring 8b is pressed against the outer peripheral surface 34 of the upper end portion 33b of the rotor body 31 of the rotor 3. A circumferential grease groove 86 is formed in the inner peripheral surface 84 of each ring 8a, 8b and grease can be filled in this grease groove 86.

The outer periphery side annular portion 82 of each ring 8a, 8b has an outer peripheral surface 85 of a width t7 that is a flat surface in a direction of the center axis 80 coincident with the center axis 20 of the circular cylinder chamber 21 in the case 2. As the outer peripheral surfaces 85 of both rings 8a, 8b have the widths t7 flatly in the direction of the center axis 80, it is possible to reduce any changes in contact areas between the outer peripheral surfaces 85 and respective counterpart surfaces in case where the first seal ring 8a and the second seal ring 8b are elastically deformed in the radial direction. The outer peripheral surface 85 of the first seal ring 8a is pressed against the inner peripheral surface 220 of the through-hole 23 of the circular cylinder chamber 21 in the case 2, and that of the second seal ring 8b is pressed against the inner peripheral surface 64 of the through-hole 60 of the lid 6.

Here, the width t6 of the inner peripheral surface 84 of the inner periphery side annular portion 81 is smaller than the width t7 of the outer peripheral surface 85 of the outer periphery side annular portion 82. Therefore, a friction coefficient of the inner peripheral surface 84 of the inner periphery side annular portion 81 becomes smaller than a friction coefficient of the outer peripheral surface 85 of the outer periphery side annular portion 82. Hence, in case of rotating the rotor 3 relative to the circular cylinder chamber 21 in the case 2, sliding occurs between the inner peripheral surface 84 with a lower friction coefficient on the inner periphery side annular portion 81 and the end portion (the lower end portion 33a or the upper end portion 33b of the rotor body 31 of the rotor 3) against which this inner peripheral surface 84 is pressed, while, the outer peripheral surface 85 with a higher friction coefficient on the outer periphery side annular portion 82 and the surface (the inner peripheral surface 220 of the through-hole 23 of the circular cylinder chamber 21 in the case 2 or the inner peripheral surface 64 of the through-hole 60 of the lid 6) against which this outer peripheral surface 85 is pressed, remain in close contact without sliding.

The coupling portion 83 is arranged between the inner periphery side annular portion 81 and the outer periphery side annular portion 82 and connects the two each other. The coupling portion 83, in the direction of the center axis 80, has a width t8 narrower than that of each of the inner periphery side annular portion 81 and the outer periphery side annular portion 82. Therefore, in case where the first seal ring 8a and the second seal ring 8b each are subject to a stress, the corresponding coupling portion 83 is elastically deformed to absorb this stress, thereby suppressing elastic deformations of both of the corresponding inner periphery side annular portion 81 and the corresponding outer periphery side annular portion 82.

In the rotary damper 1 having the above structure, when the rotor 3 is rotationally moved relative to the circular cylinder chamber 21 in the case 2 in the first rotating direction R1 (See FIG. 2(B)), the first leg portion 53 of each second seal member 5 is brought into contact with one side surface 37a of the corresponding vane 32, thereby closing the flow path 36 formed on the corresponding vane 32. At this time, the first seal member 4 attached to each partitioning portion 25 of the circular cylinder chamber 21 in the case 2 fills the gap between the end surface 26 of the partitioning portion 25 and the outer peripheral surface 34 of the rotor body 31 of the rotor 3 and fills the gap between the lower surface 63 of the lid 6 and the upper surface 29 of the partitioning portion 25, and the second seal member 5 attached each vane 32 of the rotor 3 fills the gap between the end surface 35 of the corresponding vane 32 and the inner peripheral surface 24 of the circular cylinder chamber in the case 2 (See FIG. 3(A) and FIG. 4(B)). Accordingly, movement of viscous fluid filled in the circular cylinder chamber 21 is only allowed via the gap g between the lower surface 63 of the lid 6 and the upper surface 38 of the vane 32 of the rotor 3 (See FIG. 3(B)), thereby increasing a pressure on viscous fluid in the area 21a (See FIG. 2(B)) partitioned by each vane 32 and the corresponding partitioning portion located in the first rotating direction R1 relative to the vane 32. Therefore, a high damping torque generates.

To the contrary, when the rotor 3 is rotationally moved relative to the circular cylinder chamber 21 in the case 2 in the second rotating direction R2 (See FIG. 2(B)), the first leg portion 53 of each second seal member 5 moves away from one side surface 37a of corresponding vane 32 to open the flow path 36 formed on the vane 32. Therefore, the viscous fluid filled in the circular cylinder chamber 21 moves not only via the gap g between the lower surface 63 of the lid 6 and the upper surface 38 of each vane 32 of the rotor 3, but also via the flow path 36 formed on the vane 32. A Pressure on the viscous fluid in the areas 21b (See FIG. 2(B)) partitioned by each vane 32 and the corresponding partitioning portion 25 located in the second rotating direction R2 relative to the vane 32, does not become increased as compared to that of the case of rotating the rotor 3 in the first rotating direction R1 relative to the circular cylinder chamber 21 in the case 2. Therefore, there generates a lower damping torque than that of the case of rotating the rotor 3 in the first rotating direction R1 relative to the circular cylinder chamber 21 in the case 2.

Hereinabove, one embodiment of the present invention has been described.

According to the embodiment, the first seal ring 8a made of elastic material is installed between the through-hole 23 of the circular cylinder chamber 21 in the case 2 and the lower end portion 33a of the rotor body 31 of the rotor 3, and also, the second seal ring 8b made of elastic material is installed between the through-hole 60 of the lid 6 and the upper end portion 33b of the rotor body 31. The first seal ring 8a has the outer peripheral surface 85 with a width t7 flat in the direction of the center axis 20 of the circular cylinder chamber 21 and the inner peripheral surface 84 with a width t6 flat in the direction of the center axis 20 of the circular cylinder chamber 21, the outer peripheral surface 85 of the first seal ring 8a is pressed against the inner peripheral surface 220 of the through-hole 23, and the inner peripheral surface of the first seal ring 8a is pressed against the outer peripheral surface 34 of the lower end portion 33a of the rotor body 31. The second seal ring 8b has the outer peripheral surface 85 with a width t7 flat in the direction of the center axis 20 of the circular cylinder chamber 21 and the inner peripheral surface 84 with a width t6 flat in the direction of the center axis 20 of the circular cylinder chamber 21, the outer peripheral surface 85 of the second seal ring 8b is pressed against the inner peripheral surface 64 of the through-hole 60, and the inner peripheral surface 84 of the second seal ring 8b is pressed against the outer peripheral surface 34 of the upper end portion 33b of the rotor body 31.

Therefore, in comparison with the case of using O-rings of circular cross-section instead of the first and second seal rings 8a, 8b, This allows for reduction of any changes in the following respective contact areas on deforming the first and second seal rings elastically in the radial direction due to misalignment of the rotor 3: a contact area between the first seal ring 8a and the lower end portion 33a of the rotor body 31, a contact area between the first seal ring 8a and the through-hole 23 of the circular cylinder chamber 21, a contact area between the second seal ring 8b and the upper end portion 33b of the rotor body 31, and a contact area between the second seal ring 8b and the through-hole 60 of the lid 6. As a result, seal tightness between the through-hole 23 of the circular cylinder chamber 21 and the lower end portion 33a of the rotor body 31 and between the through-hole 60 of the lid 6 and the upper end portion 33b of the rotor body 31 become stable so as to decrease the possibility of leakage of the viscous fluid filled in the circular cylinder chamber 21 through the gaps between the circular cylinder chamber 21 and the rotor body 31 and between the lid 6 and the rotor body 31

According to the embodiment, each of the first and second seal rings 8a, 8b is designed so that the width t6 of the corresponding inner peripheral surface 84 is smaller than the width t7 of the corresponding outer peripheral surface 85. Therefore, a friction coefficient of the inner peripheral surface 84 becomes smaller than a friction coefficient of the outer peripheral surface 85. In case of rotating the rotor 3 relative to the circular cylinder chamber 21 in the case 2, sliding occurs between the inner peripheral surface 84 with a lower friction coefficient and its corresponding counterpart surface (which corresponds to the outer peripheral surface 34 of the lower end portion 33a of the rotor body 31, for the first seal ring 8a; and to the outer peripheral surface 34 of the upper end portion 33b of the rotor body 31, for the second seal ring 8b), while, the outer peripheral surface 85 with a higher friction coefficient and its corresponding counterpart surface (which corresponds to the inner peripheral surface 220 of the through-hole 23 of the circular cylinder chamber 21, for the first seal ring 8a; and to the inner peripheral surface 64 of the through-hole 60 of the lid 6, for the second seal ring 8b) remain in close contact without sliding. Accordingly, sliding occurs only between the inner peripheral surface 84 smaller in circumferential length and its counterpart surface; as a result, it is possible to reduce wear volume of the first seal ring 8a and the second seal ring 8b to extend life cycle of each ring.

According to the embodiment, circumferential grease grooves 86 are formed on the inner peripheral surfaces 84 of the first and second seal rings 8a, 8b and grease is filled each grease groove 86. Therefore, frictional resistance between each of the first and second seal rings 8a, 8b and the rotor 3 becomes decreased. This causes the rotor 3 to become slidable more smoothly.

According to the embodiment, the first and second seal rings 8a, 8b each have the corresponding inner periphery side annular portion 81 rectangular in cross-section, which includes the inner peripheral surface 84; the corresponding outer periphery side annular portion 82 rectangular in cross-section, which includes the outer peripheral surface 85; and the coupling portion 83 connecting the inner periphery side annular portion 81 and the outer periphery side annular portion 82 each other. The coupling portion 83 of each ring 8a, 8b has the width t8 narrower than that of each of the inner periphery side annular portion 81 and the outer periphery side annular portion 82 in the direction of the center axis 20 of the circular cylinder chamber 21. Therefore, when a stress is applied to each of the first and second seal rings 8a, 8b, the corresponding coupling portion 83 is elastically deformed to absorb this stress, thereby suppressing elastic deformations of the inner periphery side annular portion 81 and the outer periphery side annular portion 82. This allows for reduction of any changes in the following respective contact areas: a contact area between the first seal ring 8a and the lower end portion 33a of the rotor body 31, a contact area between the first seal ring 8a and the through-hole 23 of the circular cylinder chamber 21, a contact area between the second seal ring 8b and the upper end portion 33b of the rotor body 31, and a contact area between the second seal ring 8b and the through-hole 60 of the lid 6. Therefore, seal tightness between the through-hole 23 of the circular cylinder chamber 21 and the lower end portion 33a of the rotor body 31, and between the through-hole 60 of the lid 6 and the upper end portion 33b of the rotor body 31 become more stable in property so as to decrease the possibility of leakage of the viscous fluid filled in the circular cylinder chamber 21 through the gaps between the circular cylinder chamber 21 and the rotor body 31 and between the lid 6 and the rotor body 31.

According to the embodiment, the inner peripheral surface 220 of the through-hole 23 of the circular cylinder chamber 21 in the case 2 is provided with the step 221, and the step 221 prevents the first seal ring 8a, attached to the lower end portion 33a of the rotor body 31 of the rotor 3, from moving outward in the axial direction. Furthermore, the outer peripheral surface 34 of the lower end portion 33a of the rotor body 31 is provided with the step 340a, and the step 340a prevents the first seal ring 8a, attached to the lower end portion 33a, from moving inward in the axial direction. This prevents the first seal ring 8a, attached to the lower end portion 33a of the rotor body 31, from moving in the axial direction, thus achieving further improvement in seal tightness using the first seal ring 8a in property.

Similarly, according to the embodiment, the inner peripheral surface 64 of the through-hole 60 of the lid 6 is provided with the step 65, and the step 65 prevents the second seal ring 8b attached to the upper end portion 33b of the rotor body 31 of the rotor 3, from moving outward in the axial direction. Moreover, the outer peripheral surface 34 of the upper end portion 33b of the rotor body 31 is provided with the step 340b, and the step 340b prevents the second seal ring 8b attached to the upper end portion 33b, from moving inward in the axial direction. This prevents the second seal ring 8b attached to the upper end portion 33b of the rotor body 31, from moving in the axial direction, thus achieving further improvement in seal tightness using the second seal ring 8b in property.

According to the embodiment, as resin excellent in sliding properties, such as polyamide, is used as the material for the first and second seal members 4,5, the first and second seal members 4,5 each act as a bearing to slidably support the outer peripheral surface 34 of the rotor body 31 of the rotor 3 so as to absorb rattling of the hexagon shaft due to decentering of itself and others, of transmitting the external rotational force to the rotor 3. This causes the hexagon shaft to become rotatable more smoothly.

The present invention can include, but is not limited to, the above embodiment: it will be obvious to those skilled in the art that various changes may be made without departing from the scope of the invention.

According to the above embodiment, for example, a member as used for each of the first and second seal rings 8a, 8b has the inner periphery side annular portion 81 rectangular in cross-section, which includes the inner peripheral surface 84; the outer periphery side annular portion 82 rectangular in cross-section, which includes the outer peripheral surface 85; and the coupling portion 83 which connects the inner periphery side annular portion 81 and the outer periphery side annular portion 82 each other. The present invention can include, but is not limited to, the above embodiment. Each of the first and second seal rings 8a, 8b may be any member as long as having the inner peripheral surface 84 with the width t6 in the direction of the center axis 20 of the circular cylinder chamber 21 and the outer peripheral surface 85 with the width t7 in the direction of the center axis 20 of the circular cylinder chamber 21. Such member may be an annular member rectangular in cross-section having the inner peripheral surface 84 and the outer peripheral surface 85.

According to the above embodiment, for each of the first and second seal rings 8a, 8b, the width t6 of the inner peripheral surface 84 is smaller than the width t7 of the outer peripheral surface 85; thus this causes the inner peripheral surface 84 to slide on the corresponding counterpart surface. The present invention can include, but is not limited to, the above embodiment. For each of the first and second seal rings 8a, 8b, for example, the width t7 of the outer peripheral surface 85 may be smaller than the width t6 of the inner peripheral surface 84 so that the outer peripheral surface 85 can slide over the corresponding counterpart surface. Alternatively, for each of the first and second seal rings 8a, 8b, the width t6 of the inner peripheral surface 84 may be substantially the same as the width t7 of the outer peripheral surface 85 so that both of the inner peripheral surface 84 and outer peripheral surface 85 can slide over the respective counterpart surfaces.

According to the above embodiment, the inner peripheral surfaces 84 of the first and second seal rings 8a, 8b each have the grease groove 86 circumferentially formed thereon, and grease is filled in this grease groove 86. The present invention can include, but is not limited to, the above embodiment. For each of the first and second seal rings 8a, 8b, at least one, which slides over the corresponding counterpart surface, of the inner peripheral surface 84 and the outer peripheral surface 85, may have a grease groove circumferentially formed thereon, and grease is to fill this grease groove.

According to the above embodiment, the inner peripheral surface 84 and the outer peripheral surface 85, of each of the first and second seal rings 8a, 8b, are flat in the direction of the center axis 20 of the circular cylinder chamber 21. The present invention can include, but is not limited to, the above embodiment.

The inner peripheral surfaces 84 and the outer peripheral surfaces 85, of the first and second seal rings 8a, 8b, may each be anything as long as having a width in the direction of the center axis 20 of the circular cylinder chamber 21.

FIG. 11(A) is a front view of modifications 8'a, 8'b of the first and second seal rings 8a, 8b, FIG. 11(B) is an I-I cross-section view of the modifications 8'a, 8'b illustrated in FIG. 11(A), and FIG. 11(C) is an enlarged view of the part G of the modifications 8'a, 8'b illustrated in FIG. 11(B).

These modifications 8'a, 8'b are, as well as the first and second seal rings 8a, 8b, annular members made of elastic material, such as nitrile butadiene rubber. The modification 8'a of the first seal ring 8a has an inner diameter d1 smaller than an outer diameter d4 of the lower end portion 33a of the rotor body 31 of the rotor 3 and an outer diameter d2 larger than an inner diameter (an outer diameter of the step 221) d3 of the through-hole 23 of the circular cylinder chamber in the case 2, and the modification 8'b of the second seal ring 8b has an inner diameter d1 smaller than an outer diameter d5 of the upper end portion 33b of the rotor body 31 of the rotor 3 and an outer diameter d2 larger than an inner diameter (an outer diameter of the step 65) d6 of the through-hole 60 of the lid 6. These modifications 8'a, 8'b each have an inner peripheral surface 84' with a width t6 in the direction of the center axis 80 and an outer peripheral surface 85' with a width t7 in the direction of the center axis 80. The width t6 of the inner peripheral surface 84' is substantially equal to the width t7 of outer peripheral surface 85' in each modification, but both may be different from each other.

For each modification 8'a, 8'b, the inner peripheral surface 84' is a surface being, in a cross-section in the direction of the center axis 80 corresponding to the center axis 20 of the circular cylinder chamber 21 in the case 2, substantial arc with a radius r1 larger than half of a wire width t9 in a radial direction of the corresponding modification 8'a, 8 ' b. The inner peripheral surface 84' of the modification 8'a of the first seal ring 8a is pressed against the lower end portion 33a of the outer peripheral surface 34 of the rotor body 31 of the rotor 3, and the inner peripheral surface 84' of the modification 8'b of the second seal ring 8b is pressed against the outer peripheral surface 34 of the upper end portion 33b of the rotor body 31 of the rotor 3. Similarly to this, the outer peripheral surface 85' of each modification 8'a, 8'b is a surface being, in the cross-section in the direction of the center axis 80, substantial arc with a radius r2 larger than half of the wire width t9 in the radial direction of the corresponding modification 8'a, 8'b. The outer peripheral surface 85' of the modification 8'a of the first seal ring 8a is pressed against the inner peripheral surface 220 of the through-hole 23 of the circular cylinder chamber 21 in the case 2, and the outer peripheral surface 85' of the modification 8'b of the second seal ring 8b is pressed against the inner peripheral surface 64 of the through-hole 60 of the lid 6.

Also for such the structure, it is possible to lessen the curvature of each of the inner peripheral surface 84' and the outer peripheral surface 85' in comparison with O-ring usable as an alternative for each of the modifications 8'a, 8'b. Therefore, it is possible to reduce any change in a contact area of each of the inner peripheral surface 84' and the outer peripheral surface 85' with the corresponding counterpart surface in case of deforming each modification 8'a, 8'b elastically in its radial direction. This can achieves further improvement of the seal tightness in property.

The above embodiment has been described taking the example in which the circular cylinder chamber 21 is provided with a pair of partitioning portions 25 and the rotor 3 is provided with a pair of the vanes 32. The present invention can include, but is not limited to, the above example. As far as the partitioning portion(s) 25 formed on the circular cylinder chamber and the vane(s) 32 formed the rotor 3 are the same in number, the number of the partitioning portion(s) 25 and the number of the vane(s) 32 formed the rotor 3 may be one, three, or more.

According to the above embodiment, each second seal member 5 attached to the corresponding vane 32, works as a check valve for opening and closing the flow path 36 formed on the corresponding vane 32. The present invention can include, but is not limited to, the above embodiment. Separately from the second seal member 5, the rotary damper 1 may be provided with such a check valve that closes the flow path 36 formed on the vane 32 in case of rotating the rotor 3 relative to the circular cylinder chamber 21 in the first rotating direction R1 and opens the flow path 36 formed on the vane 32 in case of rotating the rotor 3 relative to the circular cylinder chamber 21 in the second rotating direction R2.

According to the above embodiment, for each of the vanes 32, the flow path 36 is formed along the direction of the rotation of the rotor 3 so as to pass through both side surfaces 37a, 37b of the corresponding vane 32. The present invention can include, but is not limited to, the above embodiment. Instead of the vane 32 or together with the vane 32, a flow path may be formed on each partitioning portion 25 along the direction of the rotation of the rotor 3 so as to pass through both side surfaces of the corresponding partitioning portion 25. In this case, the rotary damper 1 may be provided with such a check valve that closes the flow path formed on the partitioning portion 25 in case of rotating the rotor 3 relative to the circular cylinder chamber 21 in the first rotating direction R1 and opens the flow path formed on the partitioning portion 25 in case of rotating the rotor 3 relative to the circular cylinder chamber 21 in the second rotating direction R2.

In case of having the flow path on the partitioning portion 25, the first seal member 4 may also have a similar shape to the second seal member 5, that is, a shape including: a bottom of a width longer than a circumferential width of the partitioning portion 25 at the inner peripheral edge; a first leg portion integrally formed on one end portion of the bottom, having a width larger than a radial width of the flow path of formed in the partitioning portion 25; and a second leg portion integrally formed on the other end portion of the bottom, having a width shorter than the radial width of the flow path formed in the partitioning portion 25. Moreover, the first seal member 4 may also work as a check valve: in case of rotating the rotor 3 relative to the circular cylinder chamber 21 in the first rotating direction R1, the first leg portion of the first seal member 4 is brought into contact with one side surface of the partitioning portion 25 to close the flow path 36 formed on the partitioning portion 25; and also, in the other case of rotating the rotor 3 relative to the circular cylinder chamber 21 in the second rotating direction R2, the first leg portion of the first seal member 4 moves away from one side surface of the partitioning portion 25 and the second leg portion is brought into contact with the other side surface of the partitioning portion 25 to opens the flow path 36 formed on the vane 32.

If none of the vanes 32 is provided with the flow path 36, each second seal member 5 may have any shape as long as it can close the gap between the end surface 35 of the vane 32 and the inner peripheral surface 24 of the circular cylinder chamber 21.

According to the above embodiment, the internal threaded portion 27 is formed on the opening side 28 of the inner peripheral surface 24 of the circular cylinder chamber 21, the external threaded portion 62 to be screwed into this internal threaded portion 27 is formed on the outer peripheral surface 61 of the lid 6, and also, the lid 6 is thereby fixed to the case 2. The present invention can include, but is not limited to, the above embodiment. The lid 6 may be fixed to the case 2, for example, by bolts or by rivets. Alternatively, the lid 6 and the case 2 may be joined by joining way, such as gluing and welding.

According to the above embodiment, the external rotation force is applied to the rotor 3, thus rotating the rotor 3 relatively to the circular cylinder chamber 21 in the case 2. The present invention can include, but is not limited to, the above embodiment. An external rotation force applied to the case 2 may also rotate the rotor 3 relatively to the circular cylinder chamber 21 in the case 2.

The above embodiment has been described taking the example of a so-called uni-directional rotary damper 1 in which relative rotation of the rotor 3 to the circular cylinder chamber 21 in the first rotating direction R1 generates a higher damping torque than if the rotor 3 rotates relative to the circular cylinder chamber 21 in the second rotating direction R2. The present invention can include, but is not limited to, the above embodiment. The present invention may be applied to a so-called bi-directional rotary damper that works in both of the first rotating direction R1 and the second rotating direction R2 so as to generates a damping torque depending on the resistance by the motion of the viscous fluid passing through the flow path formed on the vane 32 or the partitioning portion (the hardness of the motion of the viscous fluid through the flow path). For this case, the second seal member 5 may not serve as the check valve. The second seal member 5 may be anything as long as it can fill the gap between the end surface 35 of the vane 32 and the inner peripheral surface 24 of the circular cylinder chamber 21.

The above embodiment has been described taking the example of a rotary damper 1 which generates a damping torque in reaction to an external force by limiting a movement of the viscous fluid. The present invention can include, but is not limited to, the above embodiment. The present can be widely applied to such dampers that generate a damping force in reaction to an external force by limiting a movement of the viscous fluid.

FIG. 12(A) is a side view of a linear type damper 9 according to another embodiment of the present invention, and FIG. 12(B) is a J-J cross-section view of the linear type damper illustrated in FIG. 12(A).

A linear type damper 9 according to the embodiment can be used for a device in which a linear motion of a moving object is to be damped, such as seats with height adjustment function, and movable shelves. As illustrated in the figures, the linear type damper 9 includes: a case 920 and a lid 960 which together form a fluid holding chamber holding a viscous fluid (not shown), such as oil and silicone; and a shaft 930 housed in the fluid holding chamber so as to be linearly movable relative to the fluid holding chamber in a direction of a center axis 902.

A circular cylinder chamber 921 with one end portion opened, i.e. a space having a circular cylinder shape with a bottom, is formed inside of the case 920. An insertion hole 923 for insertion of a shaft 930 is formed in a bottom 922 of the circular cylinder chamber 921. The shaft 930, when a insertion of one end portion 933a of a shaft body 931 described below into this insertion hole 923, is housed in the circular cylinder chamber 921 so as t to align a center axis 903 of the shaft 930 with the center axis 902 of the circular cylinder chamber 921.

A mounting portion 927 for mounting a first seal ring 980a is formed in the form of an annular groove, in an inner peripheral surface 929 of the insertion hole 923. Moreover, a through-hole 926 for air vent is formed in a bottom 925 of the insertion hole 923. Furthermore, the lid 960 is fixed to an opening side 928 of an inner peripheral surface 924 of the circular cylinder chamber 921 by joining way, such as threaded joint, gluing, welding, using a screw, and using a machine screw.

The shaft 930 includes the shaft body 931 of a circular cylinder shape and a flange 932 formed near or at the middle of length of the shaft body 931.

The flange 932 projects, near or at the middle of length of the shaft body 931, radially outward from an outer peripheral surface 934 of the shaft body 931 so as to place an outer peripheral surface 935 close to an inner peripheral surface 924 of the circular cylinder chamber 921 of the case 920, thus partitioning an inside of the circular cylinder chamber 921. The flange 932 forms volume changing system to compress one area and to expand another area within the fluid holding chamber partitioned by the flange 932 in accordance with linear motion of the shaft 930 in a direction of the center axis 903. Moreover, flow paths 936 through both side surfaces 937a, 937b of the flange 932, are formed on the flange 932 along the direction of the center axis 903 of the shaft 930. A check valve 970 is installed in each flow path 936 so as to close the corresponding flow path 936 in case of moving the shaft 930, along the center axis 902 of the circular cylinder chamber 921, in a first moving direction L1, and so as to opens the corresponding flow path 936 in the other case of moving the shaft 930 in a second moving direction L2 (namely, in the direction opposite to the first moving direction L1). There formed a gap g' serving as a flow path for the viscous fluid filled in the circular cylinder chamber 921, between the outer peripheral surface 935 of the flange 932 and the inner peripheral surface 924 of the circular cylinder chamber 921 of the case 920.

The shaft body 931 works as a resistance generating member for receiving an external force in the direction of the center axis 903 of the shaft 930 to move relative to the fluid holding chamber in the direction of the center axis 902 of the circular cylinder chamber 921. One end portion 933a of the shaft body 931 is inserted, movably in the direction of the center axis 902 of the circular cylinder chamber 921, into the insertion hole 923 formed in the bottom 922 of the circular cylinder chamber 921 of the case 920, and another end portion 933b of the shaft body 931 is inserted, movably in the direction of the center axis 902 of the circular cylinder chamber 921, into a through-hole 961 of the lid 960.

The first seal ring 980a is attached to one end portion 933a of the shaft body 931 to be slidable relative to the shaft body 931. Moreover, a second seal ring 980b is attached to the other end portion 933b of the shaft body 931 to be slidable relative to the shaft body 931.

For the lid 960, the through-hole 961 for insertion of the shaft 930, which serves as an opening of the fluid holding chamber, is formed at the position facing the insertion hole 923 formed in the bottom 922 of the circular cylinder chamber 921 of the case 920. The other end portion 933b of the shaft body 931 of the shaft 930 is to be inserted into this through-hole 961. A mounting portion 962 for mounting the second seal ring 980b is formed in the form of an annular groove, in an inner peripheral surface 964 of the through-hole 961.

Figure 10:
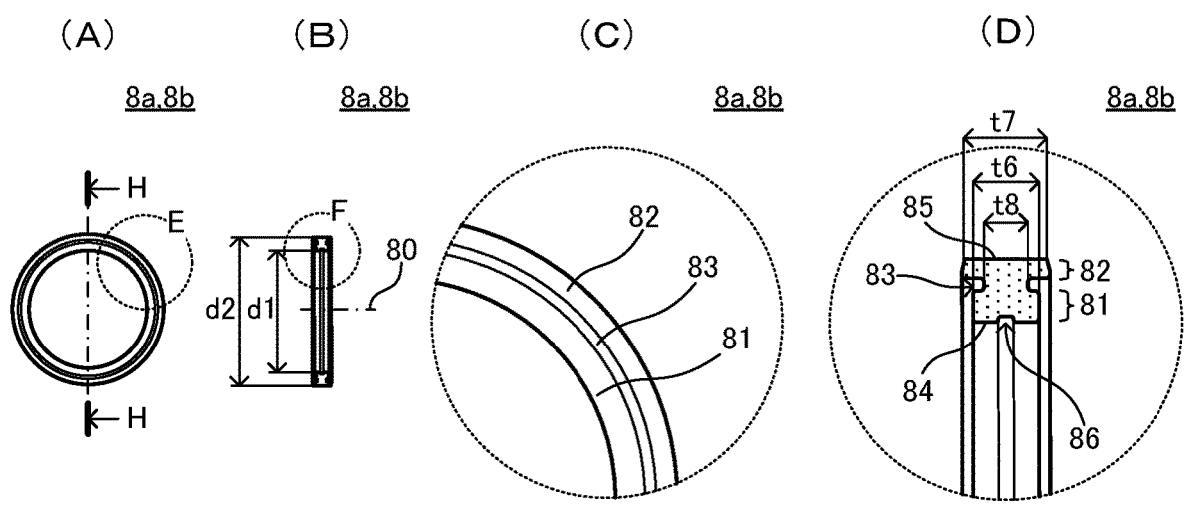
FIG. 10(A) is a front view of first and second seal rings 8$a$, 8$b$.
FIG. 10(B) is an H-H cross-section view of the first and second seal rings 8$a$, 8$b$ illustrated in FIG. 10(A)
FIG. 10(C) is an enlarged view of the part E of the first and second seal rings 8$a$, 8$b$ illustrated in FIG. 10(A)
FIG. 10(D) is an enlarged view of the part F the first and second seal rings 8$a$, 8$b$ illustrated in FIG. 10(B)
Figure 11:
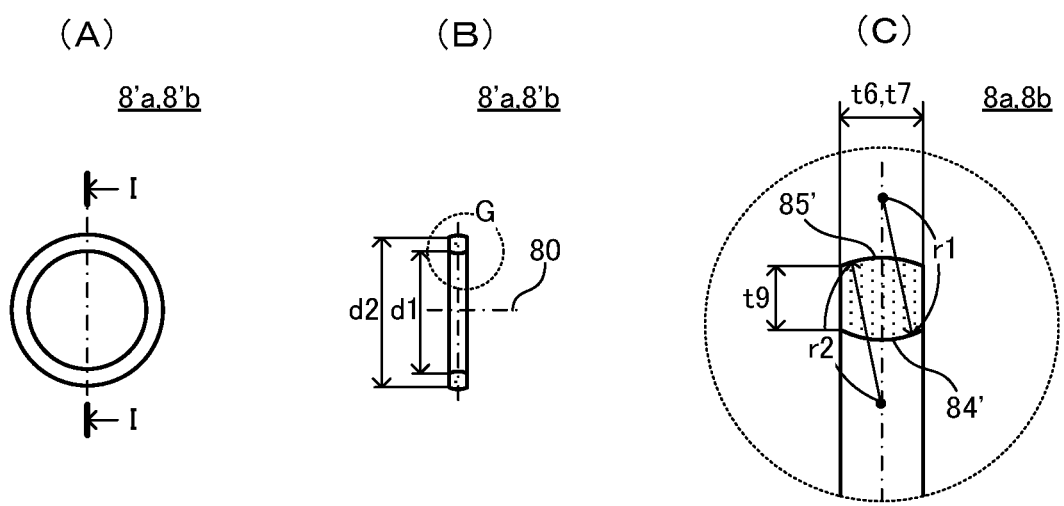
FIG. 11(A) is a front view of modifications 8'$a$, 8'$b$ of the first and second seal rings 8$a$, 8$b$.
FIG. 11(B) is an I-I cross-section view of the modifications 8'$a$, 8'$b$ illustrated in FIG. 11(A)
FIG. 11(C) is an enlarged view of the part G of the modifications 8'$a$, 8'$b$ illustrated in FIG. 11(B)

The first and second seal rings 980a, 980b are annular members formed of elastic material, such as nitrile butadiene rubber. The first seal ring 980a has an inner peripheral surface with a width in the direction of the center axis 902 of the circular cylinder chamber 921, which is slidably pressed against the outer peripheral surface 934 of the shaft body 931; and an outer peripheral surface with a width in the direction of the center axis 902 of the circular cylinder chamber 921, which is pressed against a groove bottom of the mounting portion 927 formed in the inner peripheral surface 929 of the insertion hole 923 of the case 920. The second seal ring 980b has an inner peripheral surface with a width in the direction of the center axis 902 of the circular cylinder chamber 921, which is slidably pressed against the outer peripheral surface 934 of the shaft body 931; and an outer peripheral surface with a width in the direction of the center axis 902 of the circular cylinder chamber 921, which is pressed against a groove bottom of the mounting portion 962 formed in the inner peripheral surface 964 of the through-hole 961 of the lid 960. Here, for example, the first and second seal rings 8a, 8b as illustrated in FIG. 10, modifications 8'a, 8'b of the first and second seal rings 8a, 8b as illustrated in FIG. 11, and others may be used as the first and second seal rings 980a, 980b.

In the linear type damper 9 having the above structure, an external force applied to the shaft 930 or the case 920 causes linear motion of the shaft 930 relative to the circular cylinder chamber 921 of the case 920 in the first moving direction L1, and then each check valve 970 closes the corresponding flow path 936. Accordingly, movement of the viscous fluid filled in the circular cylinder chamber 921 is only allowed via the gap g' between the outer peripheral surface 935 of the flange 932 of the shaft 930 and the inner peripheral surface 924 of the circular cylinder chamber 921, thereby increasing a pressure on the viscous fluid in the area 921a located in the first moving direction L1 relative to the flange 932. Therefore, a high damping torque generates.

To the contrary, an external force applied to the shaft 930 or the case 920 causes linear motion of the shaft 930 relative to the circular cylinder chamber 921 of the case 920 in the second moving direction L2, and then the each check valve 970 opens the corresponding flow path 936. Accordingly, the viscous fluid filled in the circular cylinder chamber 921 moves not only via the gap g' between the outer peripheral surface 935 of the flange 932 and the inner peripheral surface 924 of the circular cylinder chamber 921, but also via the flow path 936 formed on the flange 932. A Pressure on the viscous fluid in the area 921b located in the second moving direction L2 relative to the flange 930, does not become increased as compared to that of the case of rotating the shaft 930 relative to the circular cylinder chamber 921 of the case 920 in the first moving direction L1. Therefore, there generates a lower damping torque than that of the case of rotating the shaft 930 the first moving direction L1 relative to the circular cylinder chamber 921 of the case 920.

The linear type damper 9 having the above structure also achieves an advantage similar to that of the rotary damper 1 illustrated in FIG. 1. In other words, for the linear type damper 9, the first seal ring 980a is installed between the insertion hole 923 of the circular cylinder chamber 921 of the case 920 and one end portion 933a of the shaft body 931 of the shaft 930, and also, the second seal ring 980b is installed between the through-hole 961 of the lid 960 and the other end portion 933b of the shaft body 931. The first seal ring 980a has the inner peripheral surface with a width flat in the direction of the center axis 902 of the circular cylinder chamber 921, which is slidably pressed against the outer peripheral surface 934 of the shaft body 931; and the outer peripheral surface with a width in the direction of the center axis 902 of the circular cylinder chamber 921, which is pressed against the groove bottom of the mounting portion 927 formed on the inner peripheral surface 929 of the insertion hole 923 of the case 920. The second seal ring 980b has the inner peripheral surface with a width in the direction of the center axis 902 of the circular cylinder chamber 921, which is slidably pressed against the outer peripheral surface 934 of the shaft body 931; and the outer peripheral surface with a width in the direction of the center axis 902 of the circular cylinder chamber 921, which is pressed against the groove bottom of the mounting portion 962 formed on the inner peripheral surface 964 of the through-hole 961 of the lid 960.

Therefore, in comparison with the case of using O-rings of circular cross-section instead of the first and second seal rings 980a, 980b, it is possible to reduce any changes in the following respective contact areas on deforming the first and second seal rings 980a, 980b elastically in radial direction due to misalignment of the rotor 3: a contact area between the first seal ring 980a and one end portion 933a of the shaft body 931, a contact area between the first seal ring 980a and the groove bottom of the mounting portion 927 formed in the insertion hole 923 of the circular cylinder chamber 921, a contact area between the second seal ring 980b and the other end portion 933b of the shaft body 931, and a contact area between the second seal ring 980b and the groove bottom of the mounting portion 962 formed in the through-hole 961 of the lid 960. Therefore, seal tightness between the insertion hole 923 of the circular cylinder chamber 921 and one end portion 933a of the shaft body 931 and between the through-hole 961 of the lid 960 and the other end portion 933b of the shaft body 931, becomes stable in property. This decreases the possibility of leakage of the viscous fluid filled in the circular cylinder chamber 21 from gaps between the circular cylinder chamber 921 and the shaft body 931 and between the lid 960 and the shaft body 931.

REFERENCE SIGNS LIST

1: rotary damper; 2, 920: case; 3: rotor; 4: first seal member; 5: second seal member; 6, 960: lid; 7: O-ring; 8a, 980a: first seal ring; 8b, 980b: second seal ring; 9: linear type damper; 21, 921: circular cylinder chamber; 22: bottom of the circular cylinder chamber 21; 23: through-hole of the circular cylinder chamber 21; 24: inner peripheral surface of the circular cylinder chamber 21; 25: partitioning portion; 26: end surface of the partitioning portion 25; 27: internal threaded portion; 28: opening side of the circular cylinder chamber 21; 29: upper surface of the partitioning portion 25; 31: rotor body; 32: vane; 33a: lower end portion of the rotor body 31; 33b: upper end surface of the rotor body 31; 34: outer peripheral surface of the rotor body 31; 35: end surface of the vane 32; 36, 936: flow path; 37a, 37b: side surface of the vane 32; 38: insertion hole of the rotor body 31; 39: upper surface of the vane 32; 40: bottom of the first seal member 4; 41: sidewall portion of the first seal member 4; 50: bottom of the second seal member 5; 51, 52: end portion of the bottom 50 of the second seal member 5; 53: first leg portion of the second seal member 5; 54: second leg portion of the second seal member 5; 60: through-hole of the lid 6; 61: outer peripheral surface of the lid 6; 62: external threaded portion; 63: lower surface of the lid 6; 64: inner peripheral surface of the through-hole 60; 65: step of the inner peripheral surface 64; 66: groove of the lid 6; 81: inner periphery side annular portion; 82: outer periphery side annular portion; 83: coupling portion; 84: inner peripheral surface of the inner periphery side annular portion 81; 85: outer peripheral surface of the outer periphery side annular portion 82; 86: grease groove; 220: inner peripheral surface of the through-hole 23; 221: step of the inner peripheral surface 220; 340a: step of the outer peripheral surface of the lower end portion 33a; 340b: step of the outer peripheral surface 34 of the upper end portion 33b; 922: bottom of the circular cylinder chamber 921; 923: insertion hole; 924:

inner peripheral surface of the circular cylinder chamber 921; 925: bottom of the insertion hole 923; 926: through-hole for air vent; 927: mounting portion for the first seal ring 980*a*; 928: opening side of the circular cylinder chamber 921; 929: inner peripheral surface of the insertion hole 923; 930: shaft; 931: shaft body; 932: flange; 933*a*, 933*b*: end portion of the shaft body 931; 934: outer peripheral surface of the shaft body 931; 935: outer peripheral surface of the flange 932; 937*a*, 937*b*: side surface of the flange 932; 961: through-hole of the lid 960; 962: mounting portion for the second seal ring 980*b*; 964: inner peripheral surface of the through-hole 961; and 970: check valve.

The invention claimed is:

1. A damper generating a damping force in reaction to an external force by limiting a movement of a viscous fluid, the damper comprising:
   a fluid holding chamber having an opening portion and holding the viscous fluid;
   a resistance generating member inserted into the fluid holding chamber, the resistance generating member being movable relative to the fluid holding chamber by the external force;
   a volume changing means partitioning an inside of the fluid holding chamber, and the volume changing means compressing one of areas and expanding another of the areas in the partitioned fluid holding chamber with a movement of the resistance generating member relative to the fluid holding chamber;
   a flow path connecting between the areas in the fluid holding chamber partitioned by the volume changing means; and
   an elastic member of annular shape, arranged between the resistance generating member and the fluid holding chamber;
   the elastic member comprising:
   an inner peripheral surface having a width in a direction of a center axis of the fluid holding chamber and being pressed against the resistance generating member;
   an outer peripheral surface having a width in the direction of the center axis of the fluid holding chamber and being pressed against the fluid holding chamber;
   an inner periphery side annular portion having a rectangular cross section and including the inner peripheral surface of the elastic member;
   an outer periphery side annular portion having a rectangular cross section and including the outer peripheral surface of the elastic member; and
   a coupling portion connecting between the inner periphery side annular portion and the outer periphery side annular portion, the coupling portion having a width smaller than widths of the outer periphery side annular portion and the outer periphery side annular portion, in the direction of the center axis of the fluid holding chamber.

2. A damper according to claim 1, wherein:
   at least one of the inner and outer peripheral surfaces of the elastic member is a surface flatly in the direction of the center axis of the fluid holding chamber.

3. A damper according to claim 2, wherein:
   the width, in the direction of the center axis of the fluid holding chamber, of one of the inner peripheral surface and the outer peripheral surface of the elastic member is smaller than the width, in the direction of the center axis of the fluid holding chamber, of another of the inner peripheral surface and the outer peripheral surface of the elastic member.

4. A damper according to claim 2, wherein:
   at least one of the inner peripheral surface and the outer peripheral surface of the elastic member comprises a groove circumferentially formed.

5. A damper according to claim 1, wherein:
   at least one of the inner and outer peripheral surfaces of the elastic member is an arc surface having a radius in a cross-section in the direction of the center axis of the fluid holding chamber, the radius being longer than half of a radial width of the elastic member.

6. A damper according to claim 5, wherein:
   the width, in the direction of the center axis of the fluid holding chamber, of one of the inner peripheral surface and the outer peripheral surface of the elastic member is smaller than the width, in the direction of the center axis of the fluid holding chamber, of another of the inner peripheral surface and the outer peripheral surface of the elastic member.

7. A damper according to claim 5, wherein:
   at least one of the inner peripheral surface and the outer peripheral surface of the elastic member comprises a groove circumferentially formed.

8. A damper according to claim 1, wherein:
   the width, in the direction of the center axis of the fluid holding chamber, of one of the inner peripheral surface and the outer peripheral surface of the elastic member is smaller than the width, in the direction of the center axis of the fluid holding chamber, of another of the inner peripheral surface and the outer peripheral surface of the elastic member.

9. A damper according to claim 8, wherein:
   at least one of the inner peripheral surface and the outer peripheral surface of the elastic member comprises a groove circumferentially formed.

10. A damper according to claim 1, wherein:
    the resistance generating member comprises a rotor body inserted into the fluid holding chamber and housed in the fluid holding chamber to allow for rotating relative to the fluid holding chamber by a rotating force applied as the external force;
    the volume changing means comprises:
    a partitioning portion formed along the center axis of the fluid holding chamber, the partitioning portion projecting radially inward from the inner peripheral surface of the fluid holding chamber and partitioning an inside of the fluid holding chamber; and
    a vane formed along the center axis of the fluid holding chamber, the vane projecting radially outward from the outer peripheral surface of the rotor body with an end surface of the vane placed close to the inner peripheral surface of the fluid holding chamber and partitioning the inside of the fluid holding chamber.

11. A damper according to claim 10, wherein:
    the flow path is provided to one of the partitioning portion of the volume changing means and the vane, and connects between the area in the fluid holding chamber partitioned by the partitioning portion and the vane.

12. A damper according to claim 1, wherein:
    at least one of the inner peripheral surface and the outer peripheral surface of the elastic member comprises a groove circumferentially formed.

13. A damper according to claim 1, wherein:
    the resistance generating member comprises a step being formed on the outer peripheral surface facing the opening portion of the fluid holding chamber and preventing the elastic member from moving axially inwardly.

14. A damper according to claim 1, wherein:
the fluid holding chamber comprises a step being formed on an inner peripheral surface of the opening portion facing the resistance generating member and preventing the elastic member from moving axially outwardly.

15. A damper according to claim 1, further comprising:
a check valve closing the flow path on linearly moving the resistance generating member relative to the fluid holding chamber along the center axis of the fluid holding chamber in a first moving direction, or on rotating the resistance generating member relative to the fluid holding chamber in a first rotating direction, and opening the flow path on linearly moving the resistance generating member relative to the fluid holding chamber along the center axis of the fluid holding chamber in a second moving direction opposite to the first moving direction or on rotating the resistance generating member relative to the fluid holding chamber in a second rotating direction opposite to the first rotating direction.

16. A damper according to claim 1, wherein:
the fluid holding chamber comprises:
a case of a circular cylinder shape, having an opening end portion at one end; and
a lid attached to the opening end portion of the case and keeping the viscous fluid in the case;
the opening end portion of the fluid holding chamber is formed at least one of another end of the case and the lid.

17. A damper generating a damping force in reaction to an external force by limiting a movement of a viscous fluid, the damper comprising:
a fluid holding chamber having an opening portion and holding the viscous fluid;
a resistance generating member inserted into the fluid holding chamber, the resistance generating member being movable relative to the fluid holding chamber by the external force;
a volume changing means partitioning an inside of the fluid holding chamber, and the volume changing means compressing one of areas and expanding another of the areas in the partitioned fluid holding chamber with a movement of the resistance generating member relative to the fluid holding chamber;
a flow path connecting between the areas in the fluid holding chamber partitioned by the volume changing means; and
an elastic member of annular shape, arranged between the resistance generating member and the fluid holding chamber;
the elastic member comprising:
an inner peripheral surface having a width in a direction of a center axis of the fluid holding chamber and being pressed against the resistance generating member; and
an outer peripheral surface having a width in the direction of the center axis of the fluid holding chamber and being pressed against the fluid holding chamber, wherein:
at least one of the inner and outer peripheral surfaces of the elastic member is a surface flatly in the direction of the center axis of the fluid holding chamber; and
the elastic member comprises:
an inner periphery side annular portion having a rectangular cross section and including the inner peripheral surface of the elastic member;
an outer periphery side annular portion having a rectangular cross section and including the outer peripheral surface of the elastic member; and
a coupling portion connecting between the inner periphery side annular portion and the outer periphery side annular portion, the coupling portion having a width smaller than widths of the outer periphery side annular portion and the outer periphery side annular portion, in the direction of the center axis of the fluid holding chamber.

18. A damper according to claim 17, wherein:
at least one of the inner and outer peripheral surfaces of the elastic member is an arc surface having a radius in a cross-section in the direction of the center axis of the fluid holding chamber, the radius being longer than half of a radial width of the elastic member.

19. A damper according to claim 17, wherein:
at least one of the inner peripheral surface and the outer peripheral surface of the elastic member comprises a groove circumferentially formed.

* * * * *